United States Patent
Bakshi et al.

(10) Patent No.: US 12,425,309 B2
(45) Date of Patent: Sep. 23, 2025

(54) INTELLIGENT MONITORING PLATFORM USING GRAPH NEURAL NETWORKS WITH A CYBERSECURITY MESH AND ASSOCIATED CYBERSECURITY APPLICATIONS

(71) Applicant: Bank of America Corporation, Charlotte, NC (US)

(72) Inventors: Sakshi Bakshi, New Delhi (IN);
Pushkar Taneja, Hyderabad (IN);
Subhasree Baskaran, Chennai (IN);
Durga Prasad Kutthumolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 225 days.

(21) Appl. No.: 18/237,745

(22) Filed: Aug. 24, 2023

(65) Prior Publication Data
US 2025/0071027 A1 Feb. 27, 2025

(51) Int. Cl.
*H04L 41/16* (2022.01)
*H04L 9/40* (2022.01)
*H04L 41/069* (2022.01)

(52) U.S. Cl.
CPC ............ *H04L 41/16* (2013.01); *H04L 41/069* (2013.01); *H04L 63/1416* (2013.01); *H04L 63/1425* (2013.01); *H04L 63/205* (2013.01)

(58) Field of Classification Search
None
See application file for complete search history.

(56) References Cited

U.S. PATENT DOCUMENTS

| | | |
|---|---|---|
| 11,122,079 B1 | 9/2021 | Aloisio et al. |
| 11,321,066 B2 | 5/2022 | Yu et al. |
| 11,423,146 B2 | 8/2022 | Li et al. |
| 11,556,636 B2 | 1/2023 | Neil et al. |
| 11,706,226 B1 | 7/2023 | Gurinaviciute et al. |
| 11,706,241 B1 | 7/2023 | Cross et al. |

(Continued)

OTHER PUBLICATIONS

Federated Dynamic GNN with Secure Aggregation, https://www.semanticscholar.org/paper/Federated-Dynamic-GNN-with-Secure-Aggregation-Jiang-Jung/edd3d5164720dda26632cca5fdbf885fdd411a0e.

(Continued)

*Primary Examiner* — Nicholas P Celani
(74) *Attorney, Agent, or Firm* — Banner & Witcoff, Ltd.

(57) ABSTRACT

Arrangements for an intelligent monitoring platform using a cybersecurity mesh and graph neural networks (GNNs) are provided. A platform may train multiple machine learning models (e.g., a GNN model, a cybersecurity engine, and a monitoring model). The platform may generate, using a GNN model, a suspicion score for a received event processing request. Based on determining the suspicion score satisfies a threshold, the platform may generate a threat score using a cybersecurity engine. The platform may generate an anomaly record for the event processing request based on the threat score and using a monitoring model. The platform may determine a preferred node of a cybersecurity mesh for routing the event processing request based on the anomaly record. The platform may determine a threat prevention response based on the preferred node. The platform may initiate one or more security actions based on the threat prevention response.

20 Claims, 10 Drawing Sheets

(56) References Cited

U.S. PATENT DOCUMENTS

| | | | |
|---|---|---|---|
| 11,709,946 | B2 | 7/2023 | Murphy et al. |
| 11,714,903 | B1 | 8/2023 | Jia et al. |
| 11,720,686 | B1 | 8/2023 | Cross et al. |
| 11,736,448 | B2 | 8/2023 | Greene et al. |
| 12,206,693 | B1* | 1/2025 | Apostolopoulos ........................... H04L 63/1425 |
| 2019/0121978 | A1* | 4/2019 | Kraemer ................ G06F 21/565 |
| 2020/0021607 | A1* | 1/2020 | Muddu ............... G06F 3/04842 |
| 2020/0382534 | A1* | 12/2020 | Simanovsky ......... G06F 21/552 |
| 2021/0248443 | A1 | 8/2021 | Shu et al. |
| 2022/0188699 | A1 | 6/2022 | Matlick et al. |
| 2022/0279220 | A1 | 9/2022 | Khavronin et al. |
| 2023/0071715 | A1 | 3/2023 | Shapira et al. |
| 2023/0199489 | A1 | 6/2023 | Austin et al. |
| 2023/0214925 | A1 | 7/2023 | Cella et al. |
| 2023/0222531 | A1 | 7/2023 | Cella et al. |
| 2023/0231871 | A1 | 7/2023 | Jiao |
| 2023/0247048 | A1 | 8/2023 | Samosseiko et al. |
| 2023/0385732 | A1* | 11/2023 | Huo ....................... G06N 3/088 |
| 2024/0244073 | A1* | 7/2024 | McLean .............. H04L 63/1416 |

OTHER PUBLICATIONS

RLC-GNN: An improved deep architecture for spatial-based graph neural network with application to fraud detection, https://www.mdpi.com/2076-3417/11/12/5656.

* cited by examiner

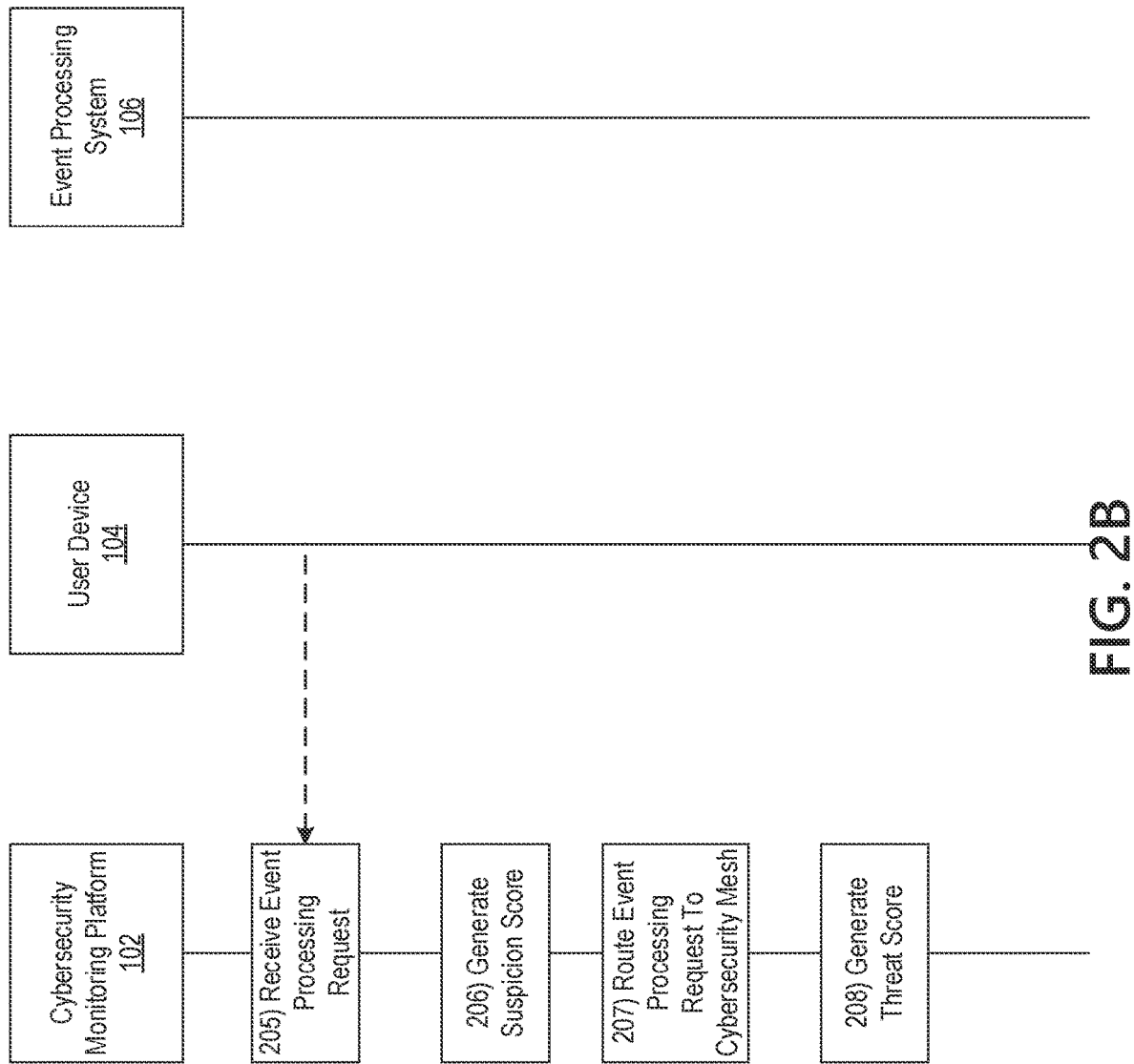

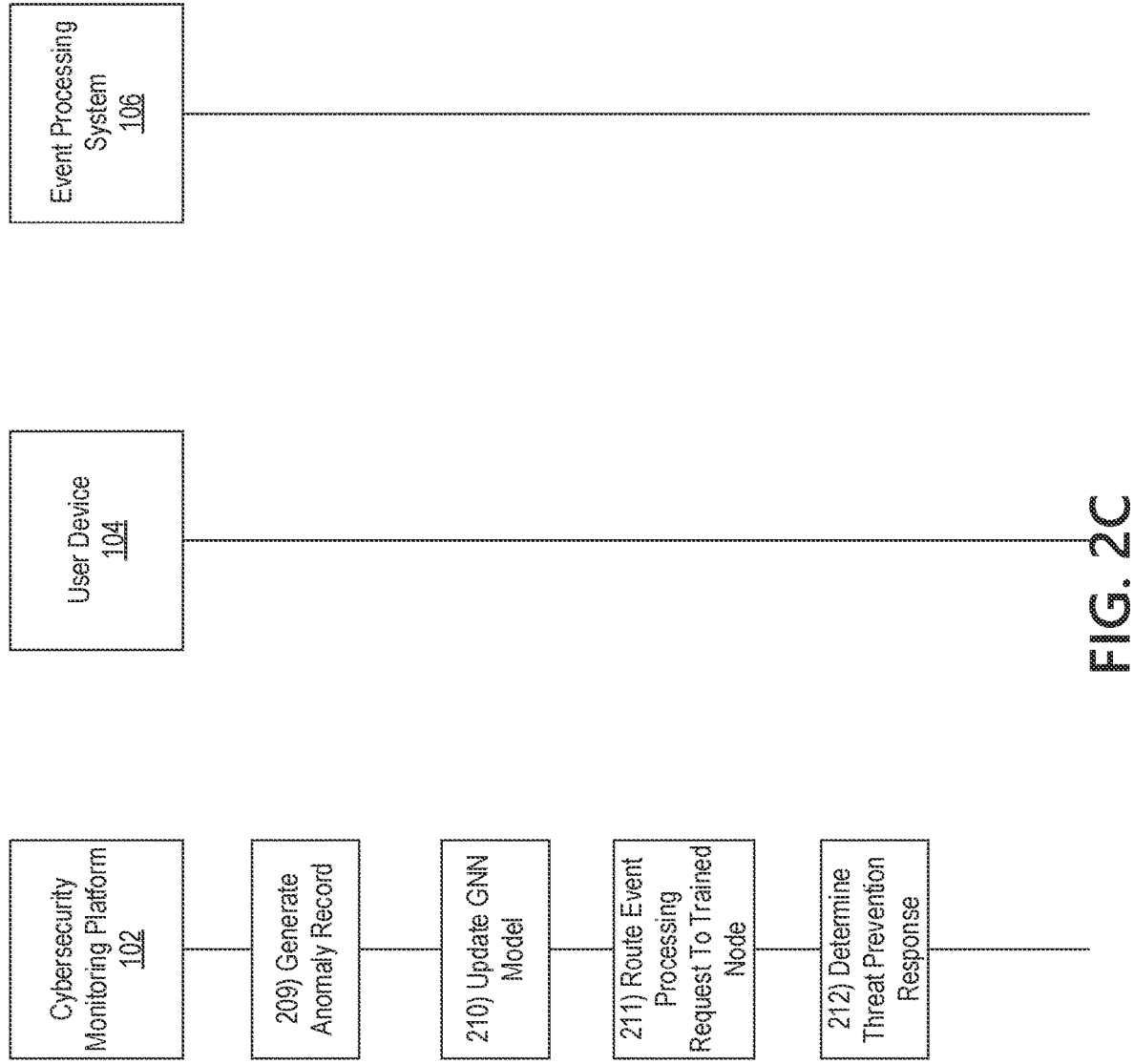

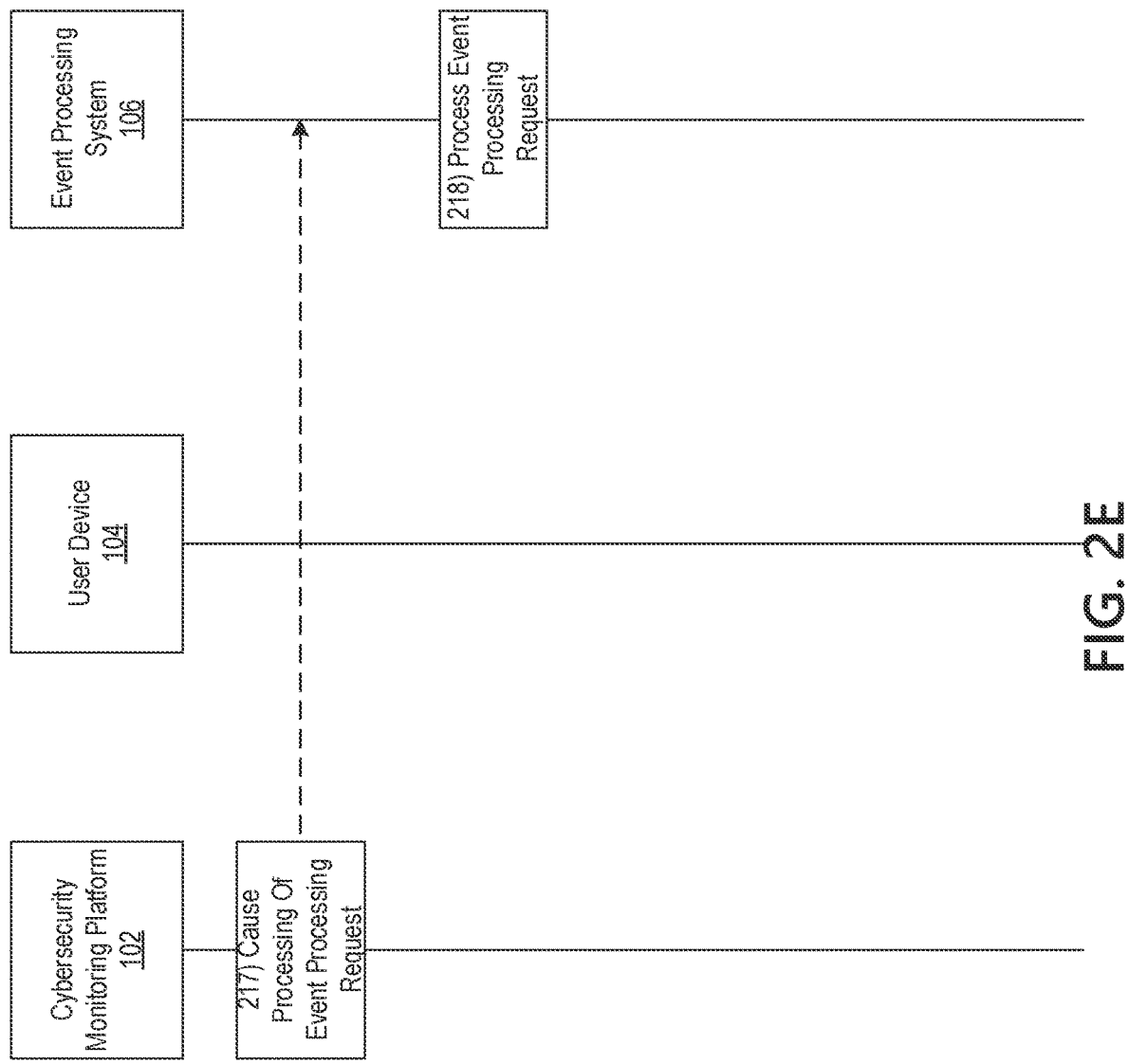

300

Security Alert Interface

Notification: Malicious Event Processing Request Flagged

Request Source: User Device

Associated Profile: Profile 1

Threat Prevention Response: Deny Request, Provide Alert, Update GNN

Modify Threat Prevention Response?

[ Yes ]    [ No ]

FIG. 3

INTELLIGENT MONITORING PLATFORM USING GRAPH NEURAL NETWORKS WITH A CYBERSECURITY MESH AND ASSOCIATED CYBERSECURITY APPLICATIONS

BACKGROUND

Aspects of the disclosure relate to an intelligent monitoring platform using graph neural networks with a cybersecurity mesh, and associated cybersecurity applications. In some instances, a system may store and/or include sensitive information that requires robust cybersecurity protections. Event processing requests related to the sensitive information may be susceptible to various cyber threats (e.g., phishing attacks, network eavesdropping, trojan attacks, interception attacks, direct invocation attacks, or the like) which may compromise sensitive information related to the request. This is especially true in distributed architecture systems where the complexity of the network makes it difficult to detect and prevent threats. Accordingly, it may be important to provide improved methods of protecting sensitive information by detecting and preventing threats associated with event processing requests.

SUMMARY

Aspects of the disclosure provide effective, efficient, scalable, and convenient technical solutions that address and overcome the technical problems associated with cybersecurity threats in distributed architecture systems. In accordance with one or more arrangements of the disclosure, a computing platform with at least one processor, a communication interface, and memory storing computer-readable instructions may train a plurality of machine learning models. The plurality of machine learning models may include at least a graph neural network (GNN) model configured to output suspicion scores based on input of event processing information, a cybersecurity engine configured to output threat scores based on input of event processing information, and a monitoring model configured to output anomaly records based on input of threat scores and based on input of event processing information. The computing platform may receive an event processing request comprising first event processing information. The computing platform may generate a suspicion score for the event processing request based on inputting the first event processing information into the GNN model. The computing platform may determine whether the suspicion score satisfies a threshold score based on comparing the suspicion score to the threshold score. The computing platform may input the first event processing information and the threat score for the event processing request into the monitoring model. Based on a determination that the suspicion score satisfies the threshold score, the computing platform may generate a threat score for the event processing request based on inputting the first event processing information into the cybersecurity engine. The computing platform may generate an anomaly record for the event processing request based on inputting the first event processing information and the threat score for the event processing request into the monitoring model. The computing platform may determine a preferred node of a cybersecurity mesh for routing the event processing request based on the anomaly record. The computing platform may route the event processing request to the preferred node. The computing platform may determine a threat prevention response based on routing the event processing request to the preferred node. The computing platform may initiate one or more security actions based on the threat prevention response.

In one or more examples, the threat prevention response may be determined based on comparing one or more rules associated with the preferred node to one or more parameters included in the first event processing information. In one or more arrangements, the threat prevention response may identify the one or more security actions based on a type of threat corresponding to the event processing request and indicated by the anomaly record.

In one or more examples, the computing platform may generate the suspicion score for the event processing request by determining a likelihood the event processing request is suspicious based on comparing the first event processing information to one or more historical event processing patterns generated by the GNN model. A given historical event processing pattern of the one or more historical event processing patterns may include a plurality of nodes representing a user associated with a historical event processing request and a plurality of edges. Each edge may correspond to a subset of historical event processing information associated with the historical event processing request.

In one or more arrangements, the computing platform may train the GNN model based on one or more historical event processing requests. The computing platform may update the GNN model based on the anomaly record. The computing platform may generate one or more event processing patterns corresponding to the event processing request using the updated GNN model. A given pattern of the one or more event processing patterns may include a plurality of nodes representing a user associated with the event processing request and a plurality of edges. Each edge may correspond to a subset of the first event processing information.

In one or more examples, the computing platform may train the cybersecurity engine based on one or more historical event processing patterns and based on one or more historical event processing requests. The computing platform may update the cybersecurity engine based on user input responsive to the one or more security actions. In one or more arrangements, the computing platform may train the monitoring model based on one or more threat prevention rules and based on historical event processing information corresponding to one or more historical threat scores. The computing platform may update the monitoring model based on the threat prevention response.

In one or more examples, the anomaly record may include the first event processing information, the threat score for the event processing request, an indication of a type of threat corresponding to the event processing request, and/or a record of one or more historical threat prevention responses corresponding to the type of threat. In one or more arrangements, the one or more security actions may be and/or include denying the event processing request, sending an alert to an event processing system, sending an alert to a remote cybersecurity platform, routing the event processing request to one or more free nodes of the cybersecurity mesh, adding, based on a first subset of the first event processing information, a device corresponding to the event processing request to a device watchlist, and/or adding, based on a second subset of the first event processing information, an account corresponding to the event processing request to an account watchlist.

In one or more examples, the computing platform may receive a second event processing requesting comprising second event processing information. The computing platform may generate a second suspicion score for the second event processing request based on comparing the second suspicion score to the threshold score. The computing platform may determine whether the second suspicion score satisfies the threshold based on comparing the second suspicion score to the threshold score. The computing platform may cause processing of the second event processing request based on a determination that the threshold score exceeds the second suspicion score. Causing processing of the second event processing request may include updating an entry at a stored distributed ledger and/or adding an entry to the stored distributed ledger.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for an intelligent monitoring platform using graph neural networks with a cybersecurity mesh and associated cybersecurity applications in accordance with one or more example arrangements;

FIG. 3 depicts an illustrative graphical user interface depicting an example security alert generated in response to detecting a threat via a monitoring platform using graph neural networks with a cybersecurity mesh in accordance with one or more example arrangements.

DETAILED DESCRIPTION

Figure 1A:
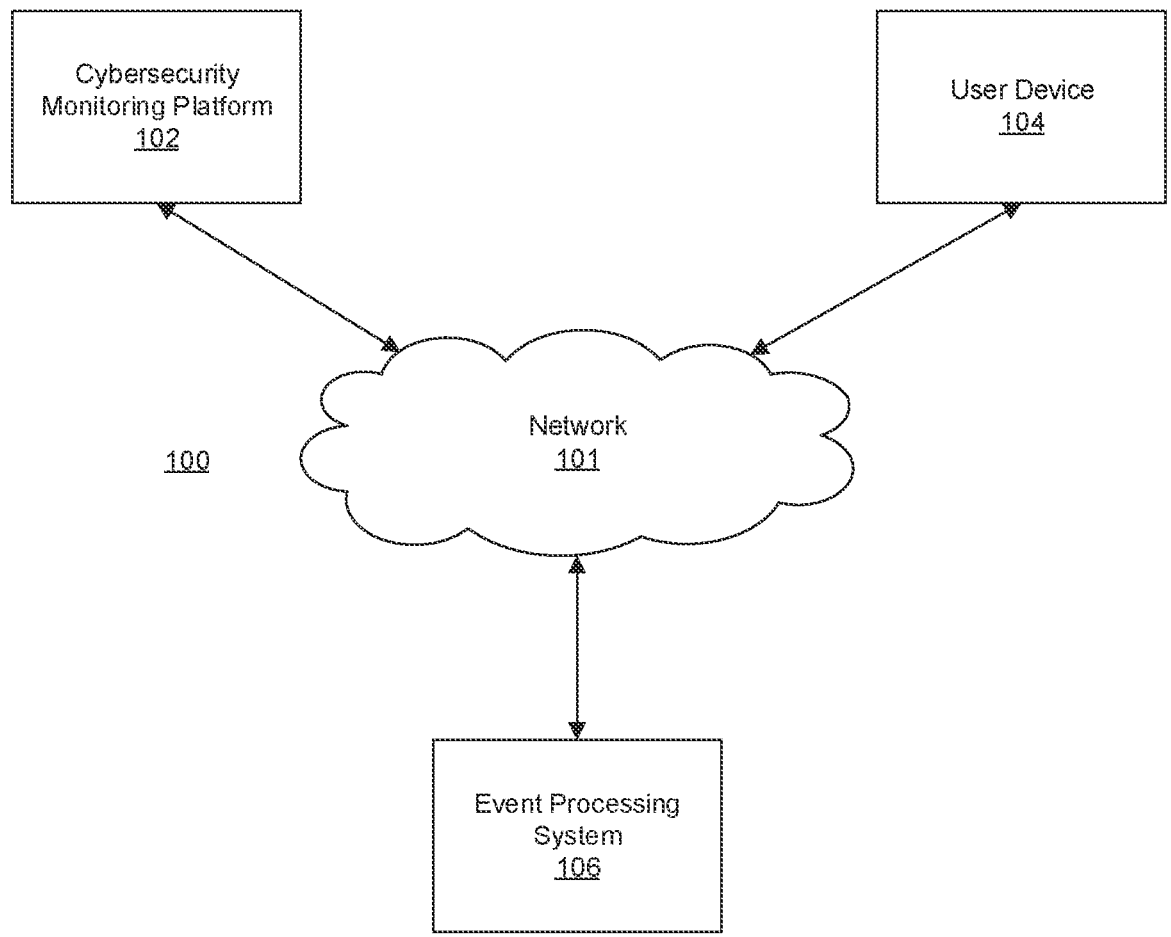
FIGS. 1A-1B depict an illustrative computing environment for an intelligent monitoring platform using graph neural networks with a cybersecurity mesh and associated cybersecurity applications in accordance with one or more example arrangements.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to an intelligent monitoring platform using graph neural networks with a cybersecurity mesh and associated cybersecurity applications.

Entities such as an enterprise organization (e.g., a financial institution, and/or other institutions) may utilize one or more systems (e.g., event processing systems, or the like) that utilize security measures to prevent against cyber threats. However, because malicious actors are continually developing and implementing new methods of initiating cyber attacks against networks (e.g., networks of devices managed by an enterprise organization, such as a financial institution and/or other institutions), traditional methods of securing enterprise systems may be inadequate in preventing and/or detecting cyber threats for such networks. This is especially true in distributed architecture systems, where the complexity of the network makes it difficult to detect and prevent cyber threats. Accordingly, there exists a strong need to provide improved methods of detecting and preventing cyber threats in distributed architecture networks.

Accordingly, in some instances, entities such as the enterprise organization and/or other organizations/institutions may employ a monitoring platform (e.g., a cybersecurity monitoring platform, or the like) that simultaneously implements a cybersecurity mesh and integrated graph neural network (GNN) procedures to provide improved detection and prevention of cyber threats. For example, the platform may use a cybersecurity mesh to provide real-time threat detection and prevention by monitoring network traffic in combination with an artificial intelligence (AI) GNN model that detects anomalies within the cybersecurity mesh. The platform may monitor real-time network traffic (e.g., event processing requests, such as requests from a user device to an event processing system to cause processing of an event related to the enterprise organization, or the like) via an AI monitoring model and may simultaneously or near-simultaneously generate event processing patterns using the GNN model. For example, the platform may generate graphical event processing patterns including edges and nodes based on information extracted from event processing requests detected in the network traffic. The GNN model may identify anomalies in an event processing pattern (e.g., by generating a suspicion score indicating an anomaly was detected) corresponding to an event processing request based on historical event processing patterns previously generated by the GNN model for historical event processing requests. Based on detecting an anomaly, the GNN may notify the monitoring model and route the event processing request to a free node (or several free nodes, in sequence) of a cybersecurity mesh (e.g., a combination of multiple nodes in a distributed architecture system, and/or similar methods of creating a cybersecurity mesh) implemented by the system. While at a free node, processing of the event processing request may be postponed such that additional cybersecurity measures may be implemented by the platform.

For instance, a third AI model, such as a cybersecurity engine or the like, may be used by the platform to generate a threat score based on comparing the event processing request to historical event processing patterns that correspond to historical cybersecurity threats. Based on the threat score, the monitoring model may generate an anomaly record based analyzing the event processing request for any features (e.g., profile information related to a user sending the event processing request, historical transfer information related to historical event processing requests, and/or other features) that match historical security threats. The anomaly record may include information (e.g., the event processing information, the threat score for the event processing request, an indication of a type of threat corresponding to the event processing request, a record of one or more historical threat prevention responses corresponding to the type of threat, and/or other information) useful for preventing cyber threats detected by the process described above. The platform may further coordinate with the cybersecurity mesh by using the anomaly record to identify a preferred and/or individually trained node of the cybersecurity mesh and further route the event processing request to that node. The individually trained node may identify, from the information in the anomaly record, the type of threat posed by the event processing request (e.g., a phishing attack, network eavesdropping, trojan attacks, interception attacks, direct invocation attacks, or the like). Based on the node identifying the type of threat posed by the event processing request, the platform may determine, using the node's identification, a threat prevention response (e.g., one or more security actions designed to prevent the type of threat posed by the event processing request, and/or other responses). By implementing one or more security actions based on the threat prevention response, the platform may prevent cyber threats designed to attack the distributed architecture.

Institutions may employ the methods of implementing a cybersecurity platform that simultaneously or near-simultaneously implements a cybersecurity mesh and a GNN via computing devices. In some instances, a device such as a computing platform may train a plurality of machine learning models (e.g., a GNN model, a cybersecurity engine, a monitoring model, and/or other models). For example, in some instances, a GNN model may be trained to generate event processing patterns based on real-time event processing requests and output a suspicion score based on extracted features of the requests (e.g., by comparing the extracted features to event processing patterns). A monitoring model may be trained to output an anomaly record based on input of an event processing request. A cybersecurity engine may be trained to generate threat scores based on patterns generated by the GNN model. The multiple-model approach utilizing both GNN and a cybersecurity mesh may improve the accuracy and success rate of cyber threat detection and prevention by providing multiple ways of detecting cyber threats and initiating an appropriate response.

Figure 1B:
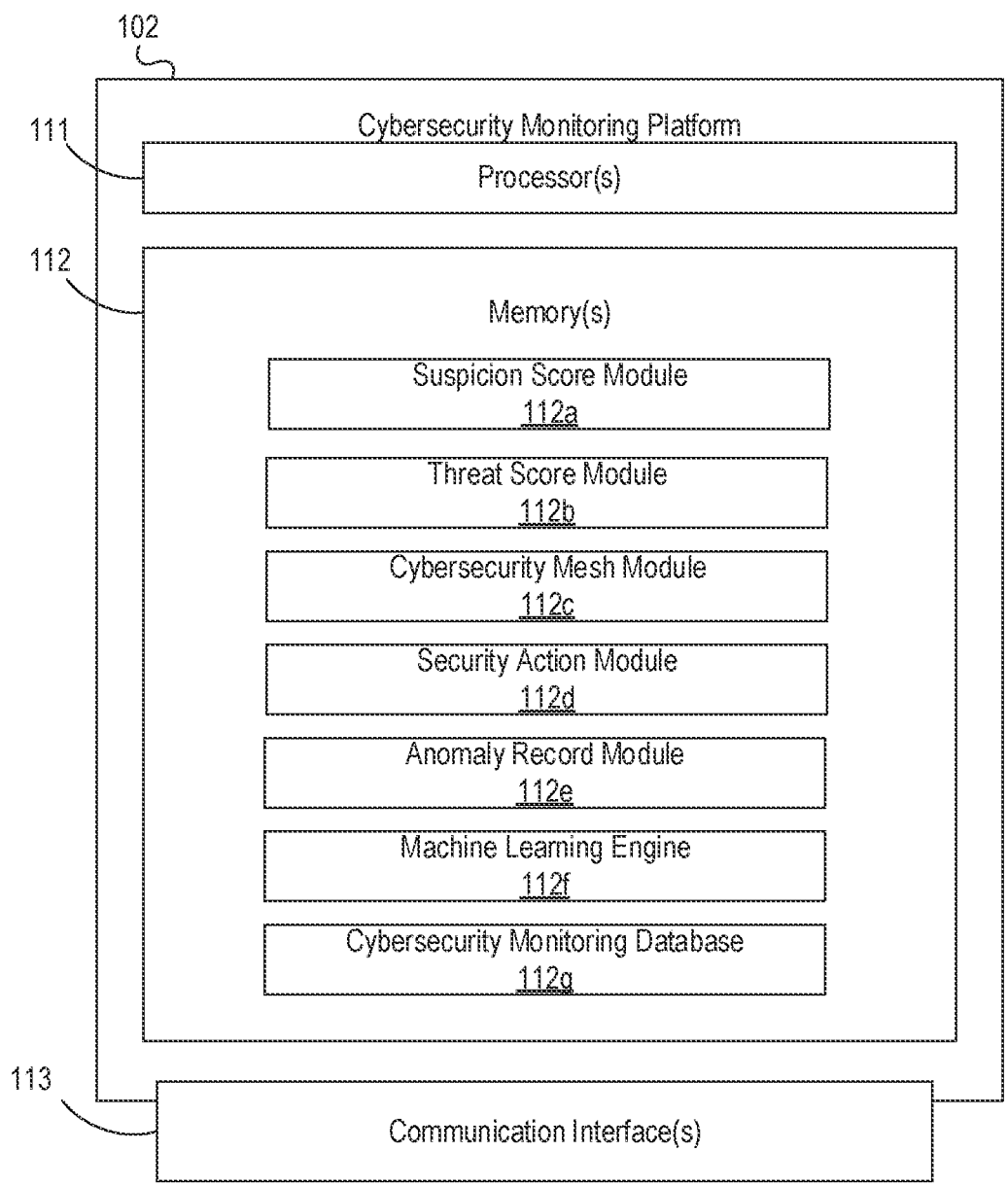

FIGS. 1A-1B depict an illustrative computing environment for an intelligent monitoring platform using graph neural networks with a cybersecurity mesh and associated cybersecurity applications in accordance with one or more example arrangements. Referring to FIG. 1A, computing environment 100 may include one or more computer systems. For example, computing environment 100 may include a cybersecurity monitoring platform 102, a user device 104, and an event processing system 106.

As described further below, cybersecurity monitoring platform 102 may be a computer system that includes one or more computing devices (e.g., servers, laptop computer, desktop computer, mobile device, tablet, smartphone, and/or other devices) and/or other computer components (e.g., processors, memories, communication interfaces) that may be used to configure, train and/or execute one or more machine learning models (e.g., a monitoring model, a cybersecurity engine, a graph neural network (GNN) model, or the like). For example, the cybersecurity monitoring platform 102 may train the one or more machine learning models to generate suspicion scores based on input of event processing information included in an event processing request. Additionally, in some instances, the cybersecurity monitoring platform 102 may train the one or more machine learning models to generate threat scores based on input of event processing information (e.g., event processing information, corresponding to an event processing request, and previously used to generate a suspicion score). Additionally, in some examples, the cybersecurity monitoring platform 102 may train the one or more machine learning models to generate anomaly records (which may, e.g., be used to generate threat prevention responses based on identifying cyberthreats) based on input of threat scores and input of event processing information (e.g., event processing information, corresponding to an event processing request, and previously used to generate a suspicion score and/or a threat score). In some examples, the cybersecurity monitoring platform 102 may be further configured to monitor network traffic between one or more additional computing devices (e.g., user device 104, event processing system 106, and/or other computing devices). In some instances, cybersecurity monitoring platform 102 may be controlled or otherwise maintained by an enterprise organization (e.g., a financial institution, and/or other institutions). In one or more examples, the cybersecurity monitoring platform 102 may be configured to communicate with one or more systems (e.g., user device 104, event processing system 106, and/or other systems) to perform an information transfer, display an interface, initiate a security action, and/or perform other functions. In one or more instances, the cybersecurity monitoring platform 102 may be integrated with, host, manage, and/or otherwise be configured to operate with a cybersecurity mesh. The cybersecurity mesh may be an architecture of a system, such as event processing system 106, that may be and/or include a distributed architecture supporting multiple security layers and individually trained nodes configured to perform particular tasks within the system. In some examples, the cybersecurity monitoring platform 102 may be further configured to host, maintain, and/or otherwise access a distributed ledger to store and/or validate event processing requests received by the cybersecurity monitoring platform 102 and routed through the cybersecurity mesh.

User device 104 may be a computing device (e.g., laptop computer, desktop computer, mobile device, tablet, smartphone, and/or other device) and/or other information storing or computing component (e.g., processors, memories, communication interfaces, databases) that may be used to transfer information between users and/or perform other user functions (e.g., sending an event processing request, displaying an alert, and/or other functions). In one or more instances, user device 104 may correspond to a first user (who may, e.g., be client of the enterprise organization, such as a financial institution and/or other institution). In one or more instances, the user device 104 may be configured to communicate with one or more systems (e.g., cybersecurity monitoring platform 102, event processing system 106, and/or other systems) to perform an information transfer, send and receive digital communications, and/or to perform other functions. In some instances, the user device 104 may be configured to display one or more graphical user interfaces (e.g., security alert interfaces, and/or other interfaces). Although shown as a single user device, it should be understood that, in some instances, one or more additional user devices similar to user device 104 may be included in computing environment 100.

Event processing system 106 may be a system that comprises one or more computing devices (e.g., laptop computers, desktop computers, mobile devices, tablets, smartphones, servers, server blades, and/or other devices) and/or other information storing or computing component (e.g., processors, memories, communication interfaces, databases), similar to user device 104, that may be used to transfer information between users and/or perform other user functions (e.g., processing an event processing request, displaying an alert, and/or other functions). In one or more instances, the devices at event processing system 106 may correspond to users, such as a second user (who may, e.g., be an employee of the enterprise organization, such as a financial institution and/or other institution). In one or more instances, the event processing system 106 may be configured to communicate with one or more systems (e.g., cybersecurity monitoring platform 102, user device 104, and/or other systems) to perform an information transfer, send and receive digital communications, display an alert, and/or to perform other functions. In some instances, the event processing system 106 may be configured to display one or more graphical user interfaces (e.g., security alert interfaces, and/or other interfaces). In some examples, the event processing system 106 may be and/or include a specific system architecture. For example, the event processing system 106 may be and/or include a system of computing devices connected via a cybersecurity mesh. The cybersecurity mesh may be and/or include a distributed architecture supporting multiple security layers and individually trained nodes configured to perform particular tasks within the system. In some instances, the event processing system 106 may include the cybersecurity monitoring platform 102 as part of its network of devices. Additionally or alternatively, in some instances the event processing system 106 may be and/or include a distributed architecture configured to host and/or maintain a distributed ledger (e.g., the distributed ledger hosted, maintained, and/or otherwise accessed by the cybersecurity monitoring platform 102).

Computing environment 100 also may include one or more networks, which may interconnect cybersecurity monitoring platform 102, user device 104, and event processing system 106. For example, computing environment 100 may include a network 101 (which may interconnect, e.g., cybersecurity monitoring platform 102, user device 104, and event processing system 106). In some instances, the network 101 may include event processing request transferred between one or more devices connected via the network 101.

In one or more arrangements, cybersecurity monitoring platform 102, user device 104, and event processing system 106 may be any type of computing device capable of sending and/or receiving requests and processing the requests accordingly. For example, cybersecurity monitoring platform 102, user device 104, and event processing system 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of cybersecurity monitoring platform 102, user device 104, and event processing system 106, may, in some instances, be special-purpose computing devices configured to perform specific functions.

Referring to FIG. 1B, cybersecurity monitoring platform 102 may include one or more processors 111, memory 112, and communication interface 113. An information bus may interconnect processor 111, memory 112, and communication interface 113. Communication interface 113 may be a network interface configured to support communication between cybersecurity monitoring platform 102 and one or more networks (e.g., network 101, or the like). Communication interface 113 may be communicatively coupled to the processor 111. Memory 112 may include one or more program modules having instructions that, when executed by processor 111, cause cybersecurity monitoring platform 102 to perform one or more functions described herein and/or one or more databases (e.g., a cybersecurity monitoring database 112g, or the like) that may store and/or otherwise maintain information which may be used by such program modules and/or processor 111. In some instances, the one or more program modules and/or databases may be stored by and/or maintained in different memory units of cybersecurity monitoring platform 102 and/or by different computing devices that may form and/or otherwise make up cybersecurity monitoring platform 102. For example, memory 112 may have, host, store, and/or include a suspicion score module 112a, threat score module 112b, cybersecurity mesh module 112c, security action module 112d, anomaly record module 112e, machine learning engine 112f, and/or cybersecurity monitoring database 112g.

Suspicion score module 112a may have instructions that direct and/or cause cybersecurity monitoring platform 102 to generate a suspicion score for an event processing request (e.g., by inputting the event processing information included in the event processing request into the GNN model), and/or perform other suspicion score generation functions. Threat score module 112b may have instructions that direct and/or cause cybersecurity monitoring platform 102 to generate a threat score for the event processing request (e.g., using the cybersecurity engine, and/or by other methods). Cybersecurity mesh module 112c may have instructions that direct and/or cause cybersecurity monitoring platform 102 to manage and/or access a cybersecurity mesh (e.g., to route the event processing request to one or more nodes of the cybersecurity mesh, and/or perform other functions). Security action module 112d may have instructions that direct and/or cause cybersecurity monitoring platform 102 to initiate one or more security actions (e.g., as a result of identifying an event processing request as a cyber threat, and/or for other purposes). Anomaly record module 112e may have instructions that direct and/or cause cybersecurity monitoring platform 102 to generate an anomaly record for an event processing request identified as a cyber threat (e.g., using the monitoring model, and/or by other methods). Machine learning engine 112f may contain instructions causing cybersecurity monitoring platform 102 to train, implement, and/or update one or more machine learning models, such as a GNN model, (that may, e.g., be used to generate suspicion scores for event processing requests), a cybersecurity engine (that may, e.g., be used to generate threat scores for suspicious event processing requests), a monitoring model (that may, e.g., be used to generate anomaly records for event processing requests identified as cyber threats, in order to determine threat prevention responses), and/or other models. In some instances, machine learning engine 112f may be used by cybersecurity monitoring platform 102 to refine and/or otherwise update methods for using graph neural networks with a cybersecurity mesh, and/or other methods described herein. Cybersecurity monitoring database 112g may have instructions causing cybersecurity monitoring platform 102 to store event processing patterns, event processing information, anomaly records, threat prevention responses, and/or other information (that may, e.g., be used to detect and prevent cyber threats using one or more machine learning models).

Figure 2A:
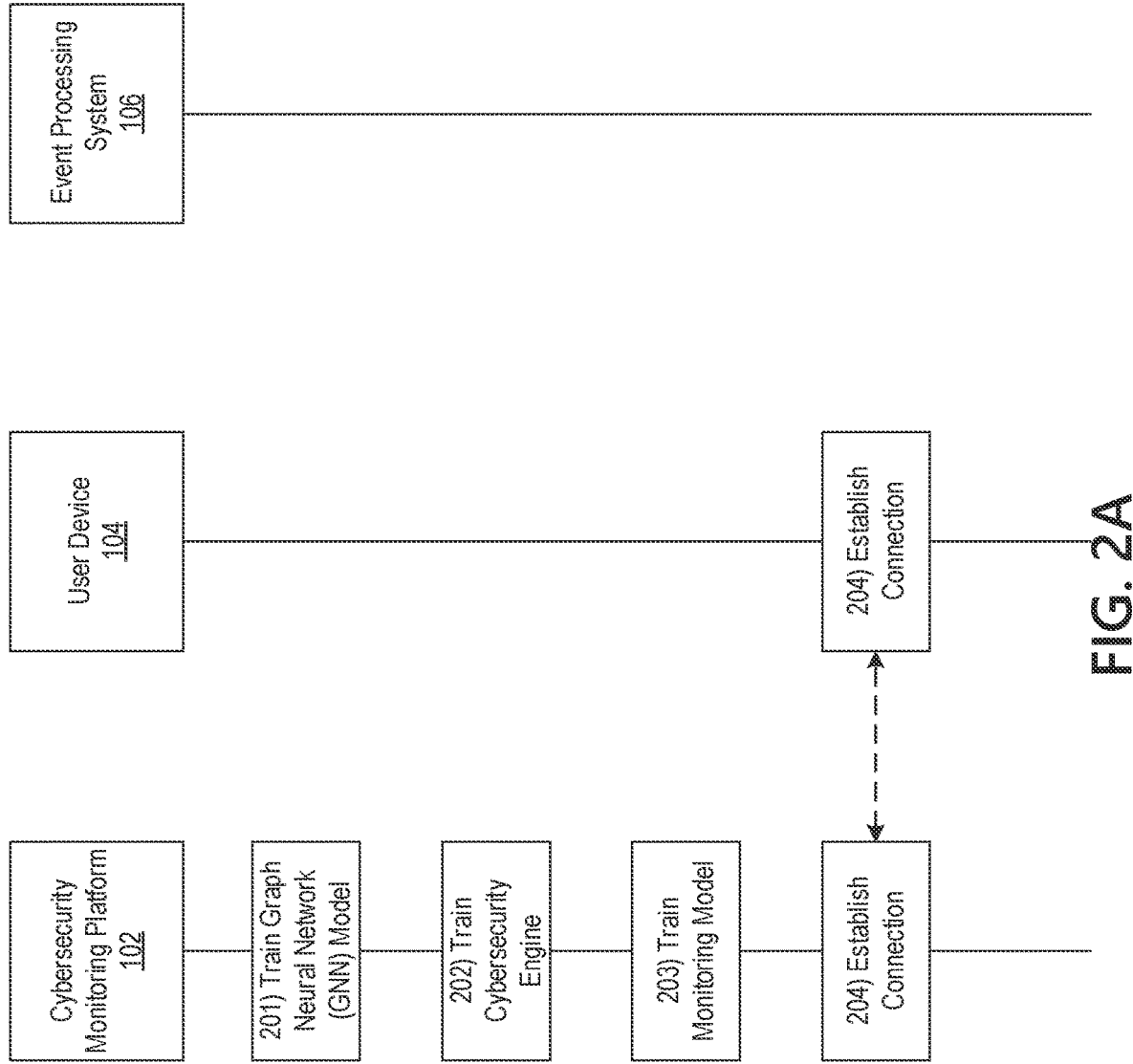

FIGS. 2A-2E depict an illustrative event sequence for an intelligent monitoring platform using graph neural networks with a cybersecurity mesh and associated cybersecurity applications in accordance with one or more example arrangements. Referring to FIG. 2A, at step 201, the cybersecurity monitoring platform 102 may train a graph neural network (GNN) model. In some instances, the cybersecurity monitoring platform 102 may configure and/or otherwise train the GNN model to generate event processing patterns based on a training set of historical event processing requests (which may, e.g., be stored in internal memory of the cybersecurity monitoring platform 102, such as memory 112, and/or external memory). The historical event processing requests may include historical event processing information associated with one or more maintained profiles (e.g., profiles of clients maintained by the enterprise organization associated with cybersecurity monitoring platform 102, and/or other profiles) corresponding to event processing requests (e.g., average account balance, average values associated with event processing requests, records of previous event processing requests, common third parties involved in previous event processing requests (e.g., commercial vendors, subscription-based services, or the like), one or more authentication certificates associated with different users, user interaction patterns, and/or other information). In some instances, to configure and/or otherwise train the GNN model, the cybersecurity monitoring platform 102 may process the training set of historical event processing requests by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the cybersecurity monitoring platform 102 may train the GNN model to generate event processing patterns based on input of event processing requests and/or event processing information.

For example, in configuring and/or otherwise training the GNN model, the cybersecurity monitoring platform 102 may identify one or more features in historical event processing requests that are indicative of a pattern of user behavior (e.g., a frequency of event processing requests over a period of time, a frequency of event processing requests involving a particular third party (e.g., a commercial vendor, or the like), an average value associated with event processing requests, an average account balance (e.g., of an account maintained by an enterprise organization, such as a financial institution and/or other institution), user interaction patterns (e.g., devices commonly used to generate event processing requests from a user, geographical locations associated with event processing requests from a user, or the like), and/or other information) associated with a particular user. For instance, the cybersecurity monitoring platform 102 may, based on historical event processing information associated with the particular user, identify information representing the particular user (e.g., a profile name corresponding to a maintained profile, an account number, or the like). The cybersecurity monitoring platform 102 may additionally identify one or more subsets of historical event processing information representative of particular event processing requests associated with the particular user (e.g., one or more devices used to generate a particular event processing request, a geographical location associated with a particular event processing request, or the like). It should be understood that the training of the GNN model is not limited to the above examples and that additional event processing information associated with one or more additional users may be used to train the GNN model.

Accordingly, the cybersecurity monitoring platform 102 may train the GNN model to generate an event processing pattern based on the identified information representing particular users and the identified one or more subsets of historical event processing information. In these examples, the cybersecurity monitoring platform 102 may train the GNN model to generate the event processing pattern as a graph made of a plurality of nodes and a plurality of edges. For example, the cybersecurity monitoring platform 102 may train the GNN model to generate individual event processing patterns for individual users, where each event processing pattern includes a plurality of nodes representing the individual user associated with some or all of the historical event processing requests and a plurality of edges connecting the nodes. Each edge of the plurality of edges may include some or all of the subsets of historical event processing information associated with the individual user. It should be understood the above description merely represents examples of how the GNN model may be trained to generate event processing patterns, and in one or more additional examples further nodes and/or edges that represent additional event processing information may be included in a generated event processing pattern.

Additionally, in some examples, the cybersecurity monitoring platform 102 may further configure and/or otherwise train the GNN model to generate suspicion scores based on the training set of historical event processing requests and based on one or more historical event processing patterns (that may, e.g., have been generated by the GNN model after the GNN model was trained as described above). For example, the cybersecurity monitoring platform 102 may configure and/or otherwise train the GNN model to generate suspicion scores based on comparing event processing requests to the one or more historical event processing patterns. For example, in configuring and/or otherwise training the GNN model the cybersecurity monitoring platform 102 may input the training set of historical event processing requests and the one or more historical event processing patterns into the GNN model. Based on inputting the training set of historical event processing requests into the GNN model, the cybersecurity monitoring platform 102 may identify a correlation between one or more features of the historical event processing requests and one or more portions of a historical event processing pattern. For example, the cybersecurity monitoring platform 102 may mine the training set of historical event processing requests and the one or more event processing patterns to identify that a particular user device (e.g., a mobile phone, a laptop computer, or the like) corresponds to all historical event processing requests associated with a particular user. For instance, the cybersecurity monitoring platform 102 may identify the particular device based on identifying that, in an event processing pattern, all the edges connected to a node representing the particular user include information of the particular user device. The cybersecurity monitoring platform 102 may then configure and/or otherwise train the GNN model to generate a suspicion score that is and/or includes a specific value (e.g., a percentage value, an integer value, a decimal value, or the like) based on identifying that an event processing request is associated with the particular user but originated from a device different from the particular user device. For example, the cybersecurity monitoring platform 102 may store a correlation between the particular user and the particular user device. It should be noted that the above are merely a few example methods by which the cybersecurity monitoring platform 102 may train the GNN model and that the cybersecurity monitoring platform 102 may additionally and/or alternatively configure and/or otherwise train the GNN model based on comparing additional nodes and/or edges of historical event processing patterns with other information of the training set of historical event processing requests.

At step 202, the cybersecurity monitoring platform 102 may train a cybersecurity engine to output threat scores based on input of event processing information. In some instances, the cybersecurity monitoring platform 102 may configure and/or otherwise train the cybersecurity engine based on a training set of historical event processing information (which may, e.g., be included in the training set of historical event processing requests described above at step 201) and/or a training set of historical event processing patterns (which may, e.g., have been generated by the GNN model after the GNN model was trained as described above at step 201). The training set of historical event processing information and the training set of historical event processing patterns may be stored in internal memory of the cybersecurity monitoring platform 102, such as memory 112, and/or external memory. The training set of historical event processing information may specifically include historical event processing information corresponding to historical event processing requests that were determined to be cyber threats (e.g., by conventional cybersecurity applications and/or by the methods described herein). The training set of historical event processing patterns may include at least one historical event processing pattern for each historical event processing request that was determined to be a cyber threat.

In some instances, to configure and/or otherwise train the cybersecurity engine, the cybersecurity monitoring platform 102 may process the training set of historical event processing information and the training set of historical event processing patterns by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the cybersecurity monitoring platform 102 may train the cybersecurity engine to output threat scores based on input of event processing requests.

For example, in configuring and/or otherwise training the cybersecurity engine, the cybersecurity monitoring platform 102 may input the training set of historical event processing information and/or the training set of historical event processing patterns into the cybersecurity engine. Based on inputting one or both of the training sets into the cybersecurity engine, the cybersecurity monitoring platform 102 may identify one or more correlations between one or more historical event processing requests identified as cyber threats and the one or more corresponding historical event processing patterns. For example, the cybersecurity monitoring platform 102 may mine the training set of historical event processing information and mine the training set of historical event processing patterns to identify that a particular subset of historical event processing information is included in one or more edges of a historical event processing pattern that corresponds to a historical event processing request identified as a cyber threat. The cybersecurity monitoring platform 102 may then configure and/or otherwise train the cybersecurity engine to generate a threat score based on input of an event processing request that includes the information in the one or more edges. For example, the cybersecurity monitoring platform 102 may store a correlation between the one or more edges and the subset of historical event processing information. In these examples, the correlation may indicate that event processing requests including the information in the one or more edges correspond to a particular likelihood (e.g., a percentage value, and/or other numerical representations of likelihood) that the event processing request is a cyber threat. It should be noted that the above are merely a few example methods by which the cybersecurity monitoring platform 102 may train the cybersecurity engine and that the cybersecurity monitoring platform 102 may additionally and/or alternatively configure and/or otherwise train the cybersecurity engine based on additional information of the training set of historical event processing information and/or of the training set of historical event processing patterns.

At step 203, the cybersecurity monitoring platform 102 may train a monitoring model to output anomaly records based on input of threat scores and based on input of event processing information. In some instances, the cybersecurity monitoring platform 102 may configure and/or otherwise train the monitoring model based on a training set of threat prevention rules and/or a training set of historical event processing information (which may, e.g., be included in the training set of historical event processing requests described above at steps 201-202). The training set of threat prevention rules and the training set of historical event processing information may be stored in internal memory of the cybersecurity monitoring platform 102, such as memory 112, and/or external memory. The training set of historical event processing information may include information associated with one or more maintained profiles (e.g., profiles of clients maintained by the enterprise organization associated with cybersecurity monitoring platform 102, and/or other profiles) corresponding to event processing requests (e.g., average account balance, average values associated with event processing requests, records of previous event processing requests, common third parties involved in previous event processing requests (e.g., commercial vendors, subscription-based services, or the like), one or more authentication certificates associated with different users, user interaction patterns, and/or other information). The training set of historical event processing information may correspond to one or more historical threat scores (which may, e.g., have been generated by the cybersecurity engine, after the cybersecurity monitoring platform 102 trained the cybersecurity engine as described above at step 202). For example, the training set of historical event processing information may correspond to one or more historical threat scores identifying a historical event processing request associated with the historical event processing information as a cyber threat.

The training set of threat prevention rules may include one or more rules configured to prevent particular types of cyber attacks (e.g., a phishing attack, network eavesdropping, trojan attacks, interception attacks, direct invocation attacks, or the like). For example, the training set of threat prevention rules may include rules directing the cybersecurity monitoring platform 102 to deny event processing requests associated with threat scores that satisfy a threshold value, rules directing the cybersecurity monitoring platform 102 to initiate one or more additional security actions (e.g., sending an alert, adding a device corresponding to an event processing request to a device watchlist, adding an account corresponding to an event processing request to an account watchlist, and/or other security actions) based on threat scores that satisfy a threshold value, or the like. In some instances, the threat prevention rules may be manually determined by a user (such as an employee of an enterprise organization, e.g. the enterprise organization associated with cybersecurity monitoring platform 102, or the like) and/or may be determined by a third party cybersecurity service provider.

In some instances, to configure and/or otherwise train the monitoring model, the cybersecurity monitoring platform 102 may process the one or more threat prevention rules and the training set of historical event processing information by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the cybersecurity monitoring platform 102 may train the monitoring model to output anomaly records based on input of threat scores and based on input of event processing information.

For example, in configuring and/or otherwise training the monitoring model, the cybersecurity monitoring platform 102 may input the threat prevention rules (e.g., as a training set) and the training set of historical event processing information into the monitoring model. Based on inputting one or both of the training sets into the monitoring model, the cybersecurity monitoring platform 102 may identify one or more correlations between one or more subsets of historical event processing information and one or more threat prevention rules. For example, the cybersecurity monitoring platform 102 may mine the training set of threat prevention rules and mine the training set of historical event processing information to identify that a particular subset of historical event processing information corresponds to a particular threat prevention rule. The cybersecurity monitoring platform 102 may then configure and/or otherwise train the monitoring model to generate anomaly records based on input of an event processing request that includes the same information as the particular subset of historical event processing information. For example, the cybersecurity monitoring platform 102 may store a correlation between a threat prevention rule directing the cybersecurity monitoring platform 102 to deny event processing requests from a particular user device (which may, e.g., be included in a device watchlist) and a subset of historical event processing information indicating that a historical event processing request corresponding to a particular threat score originated from the particular user device. In these examples, the correlation may indicate that event processing requests originating from the particular user device should cause the monitoring model to generate an anomaly record including the event processing request and a record of the threat prevention rule. In some instances, the threat prevention rule may additionally include an indication of the type of threat the rule is configured to prevent. In these instances, the cybersecurity monitoring platform 102 may further train the monitoring model to include, in the anomaly record, an indication of the type of threat. For example, referring to the particular user device example above, the cybersecurity monitoring platform 102 may train the monitoring model to include, e.g., an indication that event processing requests received and/or otherwise originating from the particular user device are, e.g., phishing attacks, in the anomaly record. It should be noted that the above are merely a few example methods by which the cybersecurity monitoring platform 102 may train the monitoring model and that the cybersecurity monitoring platform 102 may additionally and/or alternatively configure and/or otherwise train the monitoring model based on additional information of the training set of historical event processing information and/or of the one or more threat prevention rules.

At step 204, the cybersecurity monitoring platform 102 may establish a connection with user device 104. For example, cybersecurity monitoring platform 102 may establish a first wireless data connection with the user device 104 to link the user device 104 with the cybersecurity monitoring platform 102 (e.g., in preparation for sending/receiving event processing requests, and/or other functions). In some instances, the cybersecurity monitoring platform 102 may identify whether or not a connection is already established with the user device 104. If a connection is already established with the user device 104, the cybersecurity monitoring platform 102 might not re-establish the connection. If a connection is not yet established with the user device 104, the cybersecurity monitoring platform 102 may establish the first wireless data connection as described above.

Referring to FIG. 2B, at step 205, the cybersecurity monitoring platform 102 may receive an event processing request from user device 104. The event processing request may be and/or include a request to access particular information corresponding to the user of user device 104 (e.g., account information, or the like), perform a financial transaction, and/or other event processing requests. The event processing request may include event processing information required to process the event (e.g., identifying information of the user, such as a link to a maintained profile and/or other identifying information, identifying information of the user device, such as an IP address, information related to the event processing request (e.g., a value corresponding to the requested event, a recipient of the event processing request, a source of the event processing request, a geographical source of the event processing request, and/or other information) and/or other information). In receiving the event processing request, the cybersecurity monitoring platform 102 may receive the event processing request via one or more communication interfaces. For example, the cybersecurity monitoring platform 102 may receive the event processing request via communication interface 113 and while the first wireless data connection is established.

At step 206, the cybersecurity monitoring platform 102 may generate a suspicion score for the event processing request. The cybersecurity monitoring platform 102 may generate the suspicion score for the event processing request by inputting the event processing request into the GNN model. In generating the suspicion score, based on inputting the event processing request into the GNN model, the cybersecurity monitoring platform 102 may use one or more historical event processing patterns (which may, e.g., have previously been generated by the GNN model for different event processing requests). For example, the cybersecurity monitoring platform 102 may cause the GNN model to compare some or all of the event processing information included in the event processing request to one or more historical event processing patterns to determine a likelihood that the event processing request is suspicious. For instance, the cybersecurity monitoring platform 102 may cause the GNN model to determine a likelihood that the event processing request is suspicious based one on or more stored correlations stored in the cybersecurity monitoring platform 102 while training the GNN model. In some examples, the likelihood that the event processing request is suspicious may be represented by a numerical value (e.g., a percentage value, or the like) included in the suspicion score. In these examples, the cybersecurity monitoring platform 102 may cause the GNN model to generate the suspicion score as a numerical vale (e.g., an integer value, a percentage value, a decimal value, and/or any other value a machine learning model is capable of generating).

In comparing some or all of the event processing information included in the event processing request to one or more historical event processing patterns, the cybersecurity monitoring platform 102 may cause the GNN model to identify particular nodes and/or edges of the one or more historical event processing patterns that correspond to the event processing request. For example, in some instances, a historical event processing pattern may include a plurality of nodes representing a user associated with a historical event processing request and a plurality of edges connected to the nodes. Each edge may correspond to a subset of historical event processing information associated with the historical event processing request.

In some instances, the cybersecurity monitoring platform 102 may cause the GNN model to mine (e.g., analyze, parse, read, translate, and/or otherwise mine) the event processing information of the event processing request received at step 205 to identify user information (e.g., identifying information of the user, such as a link to a maintained profile and/or other identifying information) of a user (e.g., the user of user device 104) associated with the event processing request. The GNN model may compare the identified user information to a historical event processing pattern to identify one or more nodes, of the historical event processing pattern, corresponding to the user (e.g., the user of user device 104). Based on identifying the one or more nodes, the GNN model may compare each edge of the historical event processing pattern connected to the one or more nodes to the event processing information of the event processing request received at step 205.

Based on the comparison, the GNN model may identify a number and/or percentage of discrepancies between the edges and the event processing information. For example, the GNN model may identify that an edge connected to one or more nodes includes historical event processing information corresponding to a particular geographic location (e.g., a state, ZIP code, or the like). Based on comparing the edge to the event processing information, the GNN model may identify that the event processing information corresponds to a different geographic location, indicating a discrepancy between the event processing information and the historical event processing pattern (which may, e.g., correspond to the user sending the event processing request, such as the user of user device 104). In some instances, the GNN model may generate the suspicion score based on the number and/or percentage of discrepancies. For example, the cybersecurity monitoring platform 102 have previously trained the GNN model to employ an anomaly detection algorithm to generate suspicion scores. For example, the GNN model may execute the anomaly detection algorithm using the following constraints/parameters:

$$\text{If (total number of discrepancies)} \leq \frac{\text{(total edges)}}{2},$$

then: suspicion score = 100%.

If else, then: suspicion indication = 0%.

In this example, if the sum of the number of identified discrepancies is less than or equal to one-half the total number of edges connected to the nodes corresponding to the user, then the GNN model will generate a suspicion score of 100%, which may indicate the event processing request is suspicious. Else, the GNN model will generate a suspicion score of 0%, which may indicate the event processing request is not suspicious. Note that the above example is merely one algorithm the GNN model may be trained to employ in order to generate the suspicion score and in one or more instances additional or alternative algorithms may be employed and/or may correspond to different parameters.

Additionally or alternatively, in some instances, the GNN model may generate the suspicion score by summing a plurality of values (e.g., percentage values, integer values, decimal values, or the like) indicated by the stored correlations for each edge. For example, an edge of a historical event processing pattern may include a subset of historical event processing information identifying a user device (e.g., an IP address, or the like) and may, e.g., have previously been associated with a stored correlation (e.g., by the cybersecurity monitoring platform 102 and while training one or more machine learning models). The stored correlation may indicate that event processing requests including a discrepancy to the subset of historical information included in the edge should result in a value of, e.g., 5% being added to the suspicion score. In these examples, the GNN model may generate a suspicion score of 5% for the event processing request based on identifying that the event processing information includes a subset of event processing information identifying a different user device (e.g., user device 104, or the like). In these instances, the GNN model may continue to generate the suspicion score by comparing the event processing information to one or more additional edges of the historical event processing pattern and updating the cumulative sum of the suspicion score accordingly.

It should be understood that while the above description refers to a single suspicion score, the cybersecurity monitoring platform 102 may perform the functions described above for a plurality of event processing requests in additional iterations of the methods of using GNNs with a cybersecurity mesh described herein. For example, in some instances, the cybersecurity monitoring platform 102 may receive a first event processing request and generate a first suspicion score that indicates the first event processing request is suspicious (e.g., based on comparing the first suspicion score to a threshold score, as described below at step 207, and/or based on other criteria) using the functions as described above at steps 205-206. In some examples, the cybersecurity monitoring platform 102 may additionally receive a second event processing request and generate a second suspicion score that indicates the event processing request is not suspicious (e.g., based on comparing the first suspicion score to a threshold score, as described below at step 207, and/or based on other criteria) using the same functions as described above at steps 205-206.

At step 207, the cybersecurity monitoring platform 102 may route the event processing request to the cybersecurity mesh. For example, the cybersecurity monitoring platform 102 may send, forward, direct, transfer, and/or otherwise route the event processing request to a particular node of the cybersecurity mesh. In some examples, in routing the event processing request, the cybersecurity monitoring platform 102 may first compare the suspicion score for the event processing request to a threshold score. The threshold score may be a value (e.g., a percentage value, an integer value, a decimal value, and/or other values) determined manually by a user (e.g., an employee of the enterprise organization associated with cybersecurity monitoring platform 102, or the like) or determined automatically (e.g., as part of a ruleset received from a cybersecurity service provider). Based on comparing the suspicion score to the threshold score, the cybersecurity monitoring platform 102 may determine whether the suspicion score satisfies the threshold score. In some instances, based on determining that the suspicion score is less than the threshold score, the cybersecurity monitoring platform 102 may determine that the suspicion score does not satisfy the threshold score. For example, based on comparing a suspicion score of 20% to a threshold score of 50%, the cybersecurity monitoring platform 102 may determine that the suspicion score does not satisfy the threshold score. In other examples, based on determining that the suspicion score meets or exceeds the threshold score, the cybersecurity monitoring platform 102 may determine that the suspicion score satisfies the threshold score. For instance, based on comparing a suspicion score of 80% to a threshold score of 50%, the cybersecurity monitoring platform 102 may determine that the suspicion score does satisfy the threshold score.

In some instances, based on determining that the suspicion score satisfies the threshold score, the cybersecurity monitoring platform 102 may route the event processing request to one or more free nodes of the cybersecurity mesh. For example, the cybersecurity monitoring platform 102 may route the event processing request to one or more nodes that are currently in an "idle" state (e.g., are not currently performing an event processing or cybersecurity function) and/or one or more nodes that are not individually trained to perform a particular cybersecurity function. In routing the event processing request to one or more free nodes, the cybersecurity monitoring platform 102 may temporarily postpone processing of the event processing request. For example, the cybersecurity monitoring platform 102 may postpone processing of the event processing request until further cybersecurity functions have been performed by the cybersecurity monitoring platform 102 (e.g., as described below at steps 208-216). Based on routing the event processing request to the one or more free nodes, the cybersecurity monitoring platform 102 might proceed to generate a threat score for the event processing request (e.g., as described below at step 208). In some examples, based on determining that the suspicion score does not satisfy the threshold score, the cybersecurity monitoring platform 102 might proceed to step 211 and instruct the cybersecurity mesh to route the event processing request to a trained node of the cybersecurity mesh. In these examples, the cybersecurity monitoring platform 102 may instruct the cybersecurity mesh to route the event processing request to a trained node based on default rules. Additionally, in these instances, the cybersecurity monitoring platform 102 may proceed directly to step 211 and might not perform the functions described below at steps 208-210. It should be understood that the cybersecurity monitoring platform 102 may perform the functions described above in one or more additional iterations of the methods described herein, e.g., for a second event processing request and/or other event processing requests.

At step 208, based on a determination that the suspicion score satisfies the threshold score, the cybersecurity monitoring platform 102 may generate a threat score for the event processing request. The cybersecurity monitoring platform 102 may generate the threat score for the event processing request by inputting the event processing information into the cybersecurity engine. In generating the threat score, based on inputting the event processing information into the cybersecurity engine, the cybersecurity monitoring platform 102 may use one or more historical event processing patterns (which may, e.g., have previously been generated by the GNN model for different event processing requests). For example, the cybersecurity monitoring platform 102 may cause the cybersecurity engine to compare some or all of the event processing information included in the event processing request to one or more historical event processing patterns to determine a likelihood that the event processing request is a threat. For instance, the cybersecurity monitoring platform 102 may cause the cybersecurity engine to determine a likelihood that the event processing request is suspicious based one on or more stored correlations stored in the cybersecurity monitoring platform 102 while training the cybersecurity engine and/or the GNN model. In some examples, the likelihood that the event processing request is a threat may be represented by a numerical value (e.g., a percentage value, or the like) included in the threat score. In these examples, the cybersecurity monitoring platform 102 may cause the cybersecurity engine to generate the threat score as a numerical vale (e.g., an integer value, a percentage value, a decimal value, and/or any other value a machine learning model is capable of generating).

In comparing some or all of the event processing information included in the event processing request to one or more historical event processing patterns, the cybersecurity monitoring platform 102 may cause the cybersecurity engine to identify particular nodes and/or edges of the one or more historical event processing patterns that correspond to the event processing request. For example, in some instances, a historical event processing pattern may include a plurality of nodes representing a user associated with a historical event processing request and a plurality of edges connected to the nodes. Each edge may correspond to a subset of historical event processing information associated with the historical event processing request.

In some instances, the cybersecurity monitoring platform 102 may cause the cybersecurity engine to mine (e.g., analyze, parse, read, translate, and/or otherwise mine) the event processing information of the event processing request received at step 205 to identify user information (e.g., identifying information of the user, such as a link to a maintained profile and/or other identifying information) of a user (e.g., the user of user device 104) associated with the event processing request. The cybersecurity engine may compare the identified user information to a historical event processing pattern to identify one or more nodes, of the historical event processing pattern, corresponding to the user (e.g., the user of user device 104). Based on identifying the one or more nodes, the cybersecurity engine may mine each edge of the historical event processing pattern connected to the one or more nodes for one or more correlations indicating a subset of historical event processing information, included in an edge, and corresponding to a historical event processing request that was identified as a cyber threat (e.g., by a conventional cybersecurity application and/or by the methods described herein). Based on determining the one or more correlations, the cybersecurity engine may compare (1) the subset of historical event processing information included at each edge that corresponds to a correlation to (2) the event processing information of the event processing request received at step 205.

Based on comparing (1) the subset of historical event processing information included at each edge that corresponds to a correlation to (2) the event processing information, the cybersecurity engine may identify a number and/or percentage of the edges that include historical event processing information matching the event processing information of the event processing request. In some instances, the cybersecurity engine may generate the threat score based on the number and/or percentage of the edges that include historical event processing information matching the event processing information of the event processing request. For example, the cybersecurity monitoring platform 102 have previously trained the cybersecurity engine to employ a threat detection algorithm to generate threat scores. For example, the cybersecurity engine may execute the threat detection algorithm using the following constraints/parameters:

$$\text{If (sum of identified edges)} \leq \frac{\text{(total edges)}}{2}, \text{ then: threat score} = 100\%.$$

$$\text{If else, then: threat score} = 0\%.$$

In this example, if the sum of the edges that include historical event processing information matching the event processing information of the request received at step 205 is less than or equal to one-half the total number of edges (corresponding to event processing requests identified as cyber threats) connected to the nodes corresponding to the user, then the cybersecurity engine will generate a threat score of 100%. Such a threat score which may indicate the event processing request is a cyber threat. Else, the cybersecurity engine will generate a threat score of 0%, which may indicate the event processing request is not a cyber threat. Note that the above example is merely one algorithm the cybersecurity engine may be trained to employ in order to generate the threat score and in one or more instances additional or alternative algorithms may be employed and/or may correspond to different parameters.

Additionally or alternatively, in some instances, the cybersecurity engine may generate the threat score by summing a plurality of values (e.g., percentage values, integer values, decimal values, or the like) indicated by the stored correlations for each edge. For example, an edge of a historical event processing pattern may include a subset of historical event processing information identifying a user device (e.g., an IP address, or the like) and may, e.g., have previously been associated with a stored correlation (e.g., by the cybersecurity monitoring platform 102 and while training one or more machine learning models). The stored correlation may indicate that event processing requests including the same subset of historical event processing information should result in a value of, e.g., 5% being added to the threat score. In these examples, the cybersecurity engine may generate a threat score of 5% for the event processing request based on identifying that the event processing information includes the same subset of historical event processing information. In these instances, the cybersecurity engine may continue to generate the threat score by comparing the event processing information to one or more additional edges of the historical event processing pattern and updating the cumulative sum of the threat score accordingly.

It should be understood that while the above description refers to a single threat score, the cybersecurity monitoring platform 102 may perform the functions described above for a plurality of event processing requests in additional iterations of the methods of using GNNs with a cybersecurity mesh described herein without departing from the scope of this disclosure.

Referring to FIG. 2C, at step 209, the cybersecurity monitoring platform 102 may generate an anomaly record for the event processing request. In some instances, the cybersecurity monitoring platform 102 may generate the anomaly record by inputting the threat score and the event processing information into the monitoring model. Based on inputting the threat score and the event processing information into the monitoring model, the cybersecurity monitoring platform 102 may cause the monitoring model to determine an indication of a type of threat corresponding to the event processing request. In determining the indication of a type of threat corresponding to the event processing request, the monitoring model may compare some or all of the event processing information with some or all of the historical event processing information (e.g., the historical event processing information used to train the monitoring model, and/or other historical event processing information). In some instances, in performing the comparison, the monitoring model may select a subset of the event processing information and a subset of the historical event processing information based on the threat score and based on a historical threat score corresponding to the historical event processing information.

For example, in some instances, the monitoring model may simultaneously or near-simultaneously compare the threat score for the event processing request (e.g., as generated above at step 208) to a plurality of historical threat scores corresponding to subsets of the historical event processing information. Based on identifying a first historical threat score within a threshold range (e.g., a percentage range, an integer range, a decimal range, and/or other numerical ranges) of the threat score for the event processing request, the monitoring model may select the subset, of the historical event processing information, corresponding to the first historical threat score. It should be understood that the process of comparing the threat score to the historical threat score described above may be repeated in one or more additional instances and the monitoring model may select one or more additional subsets of the historical event processing information.

Additionally or alternatively, in some instances, the monitoring model may select the one or more subsets of the historical event processing information based solely or in part on a particular feature and/or other portion of information included in both the event processing information and one or more subsets of historical event processing information. For example, in some instances, the monitoring model may select every subset of the historical event processing information that corresponds to a historical event processing request originating from the same device (e.g., user device 104, or the like) as the event processing request received at step 205. In some instances, the monitoring model may additionally or alternatively select the one or more subsets of historical event processing information based on one or more different particular features and/or portions of information.

Based on selecting one or more subsets of the historical event processing information, the monitoring model may compare the one or more subsets of the historical event processing information to the event processing information of the event processing request received at step 205. Based on the comparison, the monitoring model may generate one or more similarity scores representing a similarity between the event processing information and each of the one or more subsets of historical event processing information. For example, the monitoring model may generate a similarity score based on a number of features included in both the event processing information and a subset of the historical event processing information. Consider an example where the event processing information includes ten features (e.g., an IP address of the user device associated with the event processing request, authentication information of the user, a geographical location of the user device, an account profile associated with the user, and/or other information). In this example, the monitoring model may compare the event processing information to the subset of historical event processing information to identify whether the event processing information shares the ten features. Based on the comparison, the monitoring model may identify that the subset of historical event processing information includes/shares, e.g., eight of the ten features. Based on identifying that the subset of historical event processing information includes/shares eight of the ten features the monitoring model may generate a similarity score of, e.g., 80%. It should be understood that the above example is merely one of many methods by which the monitoring model may generate a similarity score and that additional features may be used and/or additional scores may be generated without departing from the scope of this disclosure.

In some examples, the monitoring model may determine the indication of the threat type corresponding to the event processing request based on the one or more similarity scores. For example, in some instances, the monitoring model may compare the one or more similarity scores to identify the subset of historical event processing information that is most similar (e.g., corresponds to the highest similarity score) to the event processing information. Accordingly, the monitoring model may determine the indication of the threat type based on which subset of historical event processing information is most similar to the event processing information. For example, consider a scenario where the monitoring model previously generated three similarity scores (e.g., 10%, 40%, 80%), each corresponding to a different subset of historical event processing information. Based on comparing the three similarity scores, the monitoring model may identify a first subset of historical event processing information, where the first subset of historical event processing information corresponds to the similarity score with the largest value (e.g., 80%). In this example scenario, the monitoring model may identify the threat type of the historical event processing request corresponding to the first subset of historical event processing information (e.g., a phishing attack, network eavesdropping, trojan attacks, interception attacks, direct invocation attacks, or the like). Accordingly, based on identifying the threat type of the historical event processing request, the monitoring model may determine the indication of the threat type corresponding to the event processing request should indicate the same threat type as the historical event processing request.

Based on determining the indication of the threat type corresponding to the event processing request, the cybersecurity monitoring platform 102 may, in generating the anomaly record via the monitoring model (e.g., as a digital file, and/or other records), include the indication of the threat type in the anomaly record. In some examples, the cybersecurity monitoring platform 102 may additionally include further information corresponding to the event processing request and/or to the threat type in the anomaly record. For example, the cybersecurity monitoring platform 102 may include the event processing information of the event processing request, the threat score for the event processing request, and/or one or more records of one or more historical threat prevention responses corresponding to the type of threats.

At step 210, the cybersecurity monitoring platform 102 may refine, validate, and/or otherwise update the GNN model. For example, the cybersecurity monitoring platform 102 may update the GNN model using the anomaly record generated above at step 209. In some instances, updating the GNN model may include inputting the anomaly record into the GNN model. By inputting the anomaly record into the GNN model, the cybersecurity monitoring platform 102 may create an iterative feedback loop that may continuously and dynamically refine the anomaly GNN model to improve its accuracy. For example, based on inputting an anomaly record including the event processing information of the event processing request and the threat score, the cybersecurity monitoring platform 102 may cause the GNN model to generate one or more event processing patterns corresponding to the event processing request. For example, based on the event processing information included in the anomaly record, the cybersecurity monitoring platform 102 may cause the GNN model to generate an event processing pattern that includes a plurality of nodes and a plurality of edges connected to one or more nodes of the plurality of nodes. In some instances, the plurality of nodes may represent a user associated with the event processing request and may be generated based on event processing information identifying the user (e.g., authentication information, account profile information, or the like). In some examples, each node of the plurality of nodes may correspond to the same user. In some examples, each edge of the plurality of edges may correspond to a subset of the event processing information. For example, each edge may be and/or include a specific type of event processing information (e.g., information identifying the user device 104, geographic information associated with the event processing request, an intended recipient of the event processing request, and/or any other type of event processing information included in the event processing information). Based on generating the event processing pattern for the event processing request, the cybersecurity monitoring platform 102 may refine, validate, and/or otherwise update the GNN model to generate suspicion scores based on, in some instances, the event processing pattern for the event processing request (e.g., using the functions and methods described above at step 206 and for event processing requests received by the cybersecurity monitoring platform 102 in future iterations of the feedback loop).

In updating the GNN model, the cybersecurity monitoring platform 102 may improve the accuracy and success rate of the anomaly detection and suspicion score generation processes, which may, e.g., result in more efficient training of machine learning models trained by the cybersecurity monitoring platform 102 (and may in some instances, conserve computing and/or processing power/resources in doing so). The cybersecurity monitoring platform 102 may further prevent valid event processing requests from being flagged as suspicious in future iterations of the feedback loop, based on updating the GNN model.

At step 211, the cybersecurity monitoring platform 102 may route (e.g., send, forward, direct, transfer, and/or otherwise route) the event processing request to a trained node of the cybersecurity mesh. For example, the cybersecurity monitoring platform 102 may route the event processing request to a node of the cybersecurity mesh that was individually trained (e.g., as part of a conventional cybersecurity application) to process particular types of threats. In some instances, in routing the event processing request to the trained node, the cybersecurity monitoring platform 102 may first determine a preferred node of the cybersecurity mesh based on the anomaly record. For example, based on the indication of the type of threat corresponding to the event processing request and included in the anomaly record, the cybersecurity monitoring platform 102 may determine that a node individually trained to process the type of threat indicated by the anomaly record is the preferred node. Accordingly, the cybersecurity monitoring platform 102 may route the event processing request to the preferred node.

In some instances, the cybersecurity monitoring platform 102 may additionally or alternatively route the event processing request based one or more default routing rules (which may, e.g., be stored in internal memory of the cybersecurity monitoring platform 102, such as memory 112, and/or in external memory). The default routing rules may identify a default node (e.g., a node indicated by the default routing rules) as the preferred node for routing the event processing request where, e.g., no anomaly record for the event processing request was generated. For example, as described above at step 207, in some instances the cybersecurity monitoring platform 102 may determine that a suspicion score for an event processing request (e.g., a second event processing request, or the like) does not satisfy the threshold score. For instance, the cybersecurity monitoring platform 102 may determine that the threshold score exceeds the suspicion score for a second event processing request. In these examples, the cybersecurity monitoring platform 102 may route the event processing request based on the default routing rules and may cause processing of the event processing request (e.g., as described below at steps 217-218). In these instances, the cybersecurity monitoring platform 102 might not perform some or all of the functions described below at step 212-216.

At step 212, the cybersecurity monitoring platform 102 may determine a threat prevention response for the event processing request. In some examples, the threat prevention response may be and/or include one or more security actions configured to prevent and/or remedy a particular type of threat (e.g., a cyber threat, such as the threat indicated by the anomaly record, or the like). For example, the threat prevention response may be and/or include security actions such as denying the event processing request, sending an alert (e.g., a security alert, or the like) to an event processing system (e.g., event processing system 106, and/or other event processing systems), sending an alert to a remote cybersecurity platform, routing the event processing request to one or more free nodes of the cybersecurity mesh, adding a device (e.g., user device 104, and/or other devices) corresponding to the event processing request to a device watchlist, adding an account corresponding to the event processing request to an account watchlist, and/or other security actions.

In some instances, the threat prevention response may be determined based on the preferred node to which the event processing request was routed. For example, as described above at step 211, in some instances, the preferred node may have previously been individually trained to respond to a particular type of threat. In these examples, the preferred node may have been trained to apply one or more cybersecurity rules to event processing requests received by the preferred node. For instance, the preferred node may have been trained to apply rules that identify one or more security actions based on one or more parameters included in the event processing information. For example, the preferred node may have been trained to apply a rule directing the cybersecurity monitoring platform 102 to generate a threat prevention response that includes a security action of adding a device (e.g., user device 104, or the like) to a device watchlist based on a subset of the event processing information indicating the device corresponds to the event processing request. Additionally or alternatively, in some instances, the preferred node may have been trained to apply a rule directing the cybersecurity monitoring platform 102 to generate a threat prevention response that includes a security action of adding an account (e.g., an account corresponding to the user of user device 104 and managed by the enterprise organization associated with cybersecurity monitoring platform 102, and/or other accounts) to an account watchlist based on a subset of the event processing information indicating the account corresponds to the event processing request.

Additionally or alternatively, in some instances, in generating the threat prevention response, the cybersecurity monitoring platform 102 may generate a threat prevention response that identifies one or more security actions based on the type of threat corresponding to the event processing request and indicated by the anomaly record. For example, in some instances, the preferred node may have been trained to apply the one or more cybersecurity rules described above based on the type of threat corresponding to the event processing request. For instance, returning to the examples above, the preferred node may have been trained to apply the rule related to the device watchlist to a first type of threat but to apply the rule related to the account watchlist to a second type of threat. Accordingly, based on an event processing request corresponding to the first type of threat, the preferred node may apply the rule related to the device watchlist but might not apply the rule related to the account watchlist.

Figure 2D:
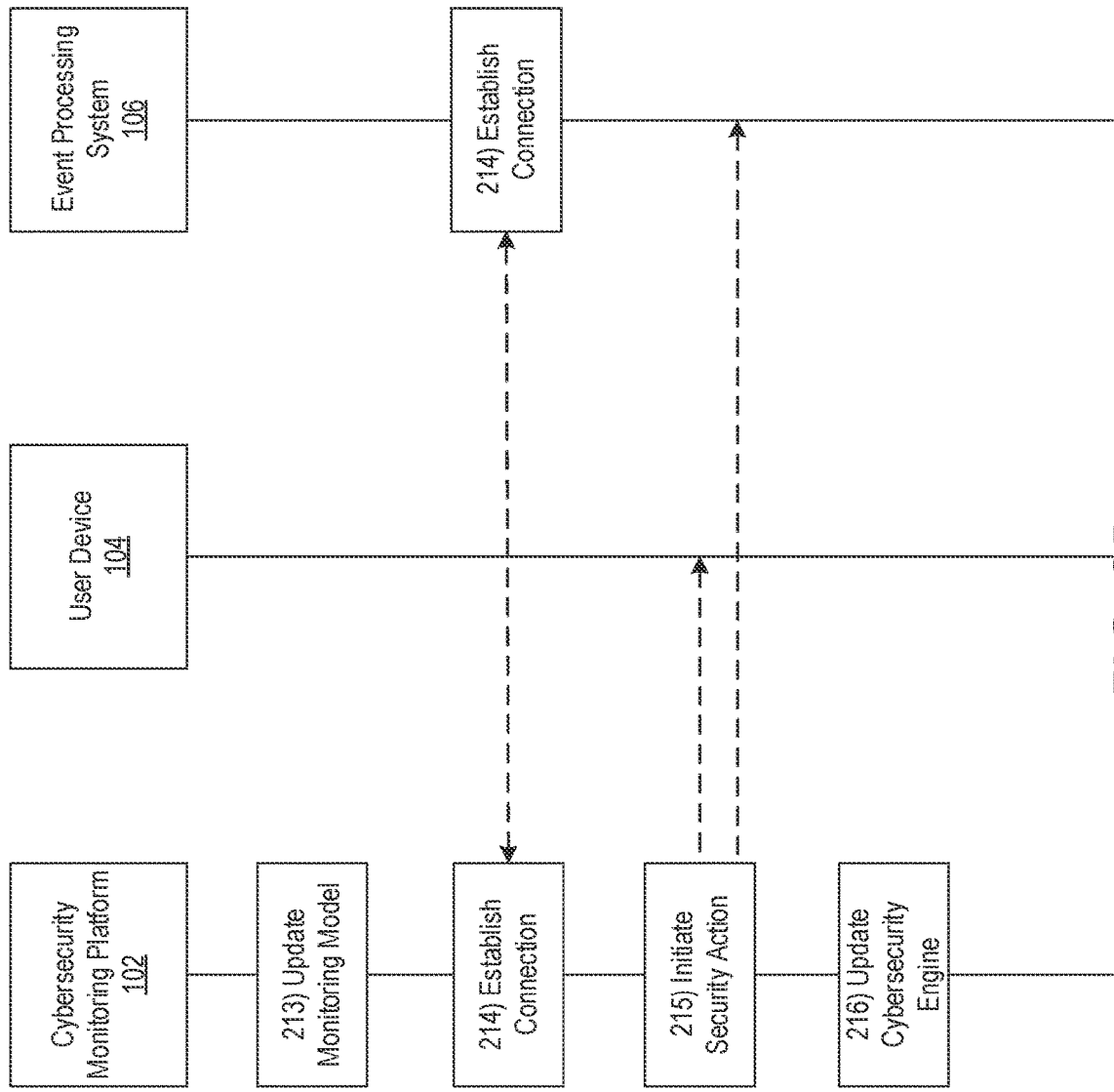

Referring to FIG. 2D, at step 213, the cybersecurity monitoring platform 102 may refine, validate, and/or otherwise update the monitoring model. For example, the cybersecurity monitoring platform 102 may update the monitoring model using the threat prevention response generated at step 212. In some instances, updating the monitoring model may include inputting the threat prevention response into the monitoring model. By inputting the threat prevention response into the monitoring model, the cybersecurity monitoring platform 102 may create an iterative feedback loop that may continuously and dynamically refine the monitoring model to improve its accuracy. For example, based on inputting the threat prevention response, the cybersecurity monitoring platform 102 may cause the monitoring model to generate anomaly records for event processing requests in future iterations of the feedback loop by comparing event processing information of the future event processing request to the threat prevention response. In these examples, based on identifying that the future event processing request includes event processing information matching the event processing information used to generate the threat prevention response, the monitoring model may generate an anomaly record (1) including an indication of a type of threat corresponding to the threat prevention response and/or (2) including a record of the threat prevention response.

In updating the monitoring model, the cybersecurity monitoring platform 102 may improve the accuracy and effectiveness of the anomaly record generation processes, which may, e.g., result in more efficient training of machine learning models trained by the cybersecurity monitoring platform 102 (and may in some instances, conserve computing and/or processing power/resources in doing so). The cybersecurity monitoring platform 102 may further cause the monitoring model to generate robust anomaly records that include records of multiple threat prevention responses generated using the functions described above. In generating robust anomaly records, the cybersecurity monitoring platform 102 may provide improved cybersecurity by improving the threat detection and response methods described herein.

At step 214, the cybersecurity monitoring platform 102 may establish a connection with the event processing system 106. For example, cybersecurity monitoring platform 102 may establish a second wireless data connection with the event processing system 106 to link the event processing system 106 with the cybersecurity monitoring platform 102

(e.g., in preparation for sending event processing requests, initiating security actions, and/or other functions). In some instances, the cybersecurity monitoring platform 102 may identify whether or not a connection is already established with the event processing system 106. If a connection is already established with the event processing system 106, the cybersecurity monitoring platform 102 might not re-establish the connection. If a connection is not yet established with the event processing system 106, the cybersecurity monitoring platform 102 may establish the second wireless data connection as described above. In some examples, in establishing the connection with the event processing system 106, the cybersecurity monitoring platform 102 may establish the connection with a particular user device included in the event processing system 106.

At step 215, the cybersecurity monitoring platform 102 may initiate one or more security actions based on the threat prevention response generated at step 212. The one or more security actions may affect one or more additional devices (e.g., user device 104, event processing system 106, and/or other devices). The one or more security actions may include denying the event processing request, sending an alert (e.g., a security alert, or the like) to an event processing system (e.g., event processing system 106, and/or other event processing systems), sending an alert to a remote cybersecurity platform, routing the event processing request to one or more free nodes of the cybersecurity mesh, adding a device (e.g., user device 104, and/or other devices) corresponding to the event processing request to a device watchlist, adding an account corresponding to the event processing request to an account watchlist, and/or other security actions.

In some examples, in initiating the security action, the cybersecurity monitoring platform 102 might initiate one or more security actions that require a connection to an additional device (e.g., user device 104, a device included in event processing system 106, or the like). For instance, the cybersecurity platform 102 may output instructions to deny the event processing request. For example, the cybersecurity monitoring platform 102 may send one or more commands (e.g., via the communication interface 113 and while the second wireless data connection is established) to a distributed architecture (e.g., the distributed architecture of event processing system 106) directing one or more devices (e.g., enterprise devices associated with the event processing system 106, or the like) to deny the event processing request. In these examples, sending the one or more commands may cause a denial of the event processing request (e.g., cancel the request, block the request, and/or otherwise deny the event processing request).

Additionally or alternatively, in some instances, in initiating the one or more security actions the cybersecurity monitoring platform 102 may output a security alert. For example, the cybersecurity monitoring platform 102 may output the security alert to an event processing system (e.g., a system, such as event processing system 106, managed by an enterprise organization, such as the enterprise organization associated with the cybersecurity monitoring platform 102, and/or other organizations). The security alert may include one or more of a cellular call, a text alert, a chime, a scroll banner, a ping, and/or other methods of alerting a user device that may, e.g., be included in the event processing system. In some examples, the cybersecurity monitoring platform 102 may output the security alert to the event processing system by sending the security alert to a user device affiliated with the event processing system. For example, the cybersecurity monitoring platform 102 may send the security alert to, e.g., a user device included in the event processing system 106, via the communication interface 113 and while a wireless data connection is established (which may, e.g., have previously been established between event processing system 106 and cybersecurity monitoring platform 102). In some instances, in sending the security alert to the user device included in the event processing system 106, the cybersecurity monitoring platform 102 may additionally send one or more display commands directing the user device included in the event processing system 106 to display a user interface. Based on or in response to the one or more display commands, the user device included in the event processing system 106 may display the user interface. For example, the user device included in the event processing system 106 may display a security alert interface.

For instance, in displaying the security alert interface, the user device included in the event processing system 106 may display a graphical user interface similar to security alert interface 300, which is illustrated in FIG. 3. Referring to FIG. 3, in some instances, the security alert interface 300 may include information corresponding to the event processing request and/or corresponding to the threat prevention response. For example, the security alert interface 300 may include information such as a notification that the event processing request was flagged by the methods of using a cybersecurity mesh with GNNs described herein (e.g., was flagged as a malicious event and/or a cyber threat), event processing information related to the threat prevention response (e.g., the source of the event processing request, an account profile associated with the event processing request, and/or other information), the one or more security actions proposed and/or initiated by the threat prevention response, and/or other information. The security alert interface 300 may also display interface elements or selectable options requesting user input. For example, the security alert interface 300 may display one or more of: an information entry field, a button or buttons, toggle or toggles, check box or boxes, and/or other interface elements. For example, as illustrated in FIG. 3, the interface elements may be one or more buttons the user might toggle to modify the threat prevention response (which may, e.g., update the threat prevention response). In some instances, based on user input requesting modification of the threat prevention response, the user device included in the event processing system 106 may request additional user input indicating which rules included in the threat prevention response to update (not shown) and may, e.g., cause one or more additional security actions to be initiated by the cybersecurity monitoring platform 102 and/or may cause one or more security actions proposed by the threat prevention response but not yet initiated by the cybersecurity monitoring platform 102 to be removed from a schedule of security actions.

Referring back to FIG. 2D, at step 215, in some examples, in initiating a security action the cybersecurity monitoring platform 102 may additionally or alternatively output a security alert to user device 104 and/or other user devices. For example, the cybersecurity monitoring platform 102 may output the security alert via the communication interface 113 and while the first wireless data connection is established. The suspicion notification may be and/or include an alert, chime, scroll banner, ping, and/or other notification which may be displayed by the user device 104. Additionally, in some instances, in sending the security alert, the cybersecurity monitoring platform 102 may additionally send one or more display commands directing the user device 104 to display a user interface. Based on or in response to the one or more display commands, the user device 104 may display the user interface. For example, the user device 104 may display a security alert interface, which may be the same as or similar to the security alert interface 300 depicted in FIG. 3 and described above. In some instances, the security alert interface displayed by the user device 104 may not include the request for user input.

At step 216, the cybersecurity monitoring platform 102 may refine, validate, and/or otherwise update the cybersecurity engine. For example, the cybersecurity monitoring platform 102 may update the cybersecurity engine based on user input received in response to one or more security actions initiated by the cybersecurity monitoring platform 102. For example, the cybersecurity monitoring platform 102 may update the cybersecurity engine based on user input received from a user device included in the event processing system 106 and received in response to displaying a security alert. In some instances, updating the cybersecurity engine may include inputting the user input into the cybersecurity engine. By inputting the user input into the cybersecurity engine, the cybersecurity monitoring platform 102 may create an iterative feedback loop that may continuously and dynamically refine the cybersecurity engine to improve its accuracy. For example, based on inputting the user input, the cybersecurity monitoring platform 102 may cause the monitoring model to generate threat scores for event processing requests in future iterations of the feedback loop by modifying, based on the user input, a threat score generated using the functions described above at step 208. For instance, based on identifying that the user input includes instructions adding and/or removing one or more security actions related to the event processing request received at step 205 from a schedule of security actions, the cybersecurity engine may increase and/or decrease the threat score for a future event processing request based on a similarity score between the future event processing request and the event processing request received at step 205 and corresponding to the user input.

In updating the cybersecurity engine, the cybersecurity monitoring platform 102 may improve the accuracy and effectiveness of the threat score generation processes, which may, e.g., result in more efficient training of machine learning models trained by the cybersecurity monitoring platform 102 (and may in some instances, conserve computing and/or processing power/resources in doing so). The cybersecurity monitoring platform 102 may further cause the cybersecurity engine to improve the threat detection and response methods described herein by generating threat scores based on user input, as described above.

Referring to FIG. 2E, at step 217, based on the cybersecurity monitoring platform 102 routing the event processing request based on the default routing rules (e.g., as opposed to routing based on the anomaly record and performing the steps described above at steps 212-216, the cybersecurity monitoring platform 102 may cause processing of the event processing request. For example, in causing processing of the event processing request, the cybersecurity monitoring platform 102 may send the event processing request via the communication interface 113 and while the second wireless data connection is established. In some instances, in sending the event processing request, the cybersecurity monitoring platform 102 may additionally send one or more commands directing the event processing system 106 to process the event processing request.

At step 218, based on receiving the event processing request from cybersecurity monitoring platform 102, the event processing system 106 may process the event processing request. For example, the event processing system 106 may analyze the event processing information included in the event processing request and initiate one or more functions to execute the event processing request. For instance, the event processing system 106 may update and/or add an entry to a stored distributed ledger (e.g., a blockchain, or the like) maintained and/or otherwise managed by the event processing system 106. The distributed ledger may include a plurality of entries, each corresponding to one or more event processing requests processed by the event processing system 106. In some instances, the event processing system 106 may send one or more messages to the cybersecurity monitoring platform 102 (e.g., via the communication interface 113 and while the second wireless data connection is established) indicating that the event processing request has been processed.

Figure 4A:
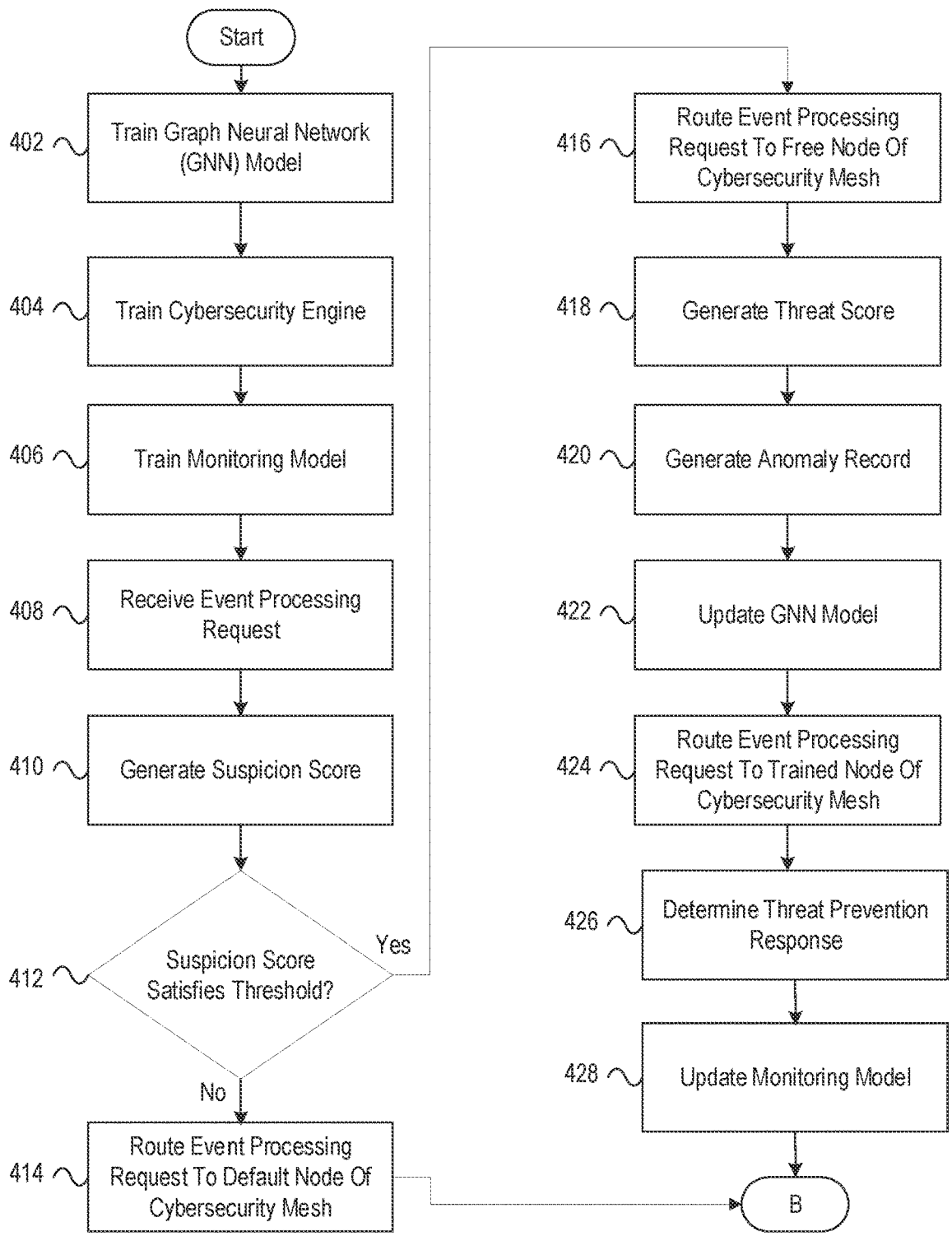
FIGS. 4A-4B depict an illustrative method for implementing an intelligent monitoring platform using graph neural networks with a cybersecurity mesh and associated cybersecurity applications in accordance with one or more example arrangements.
Figure 4B:
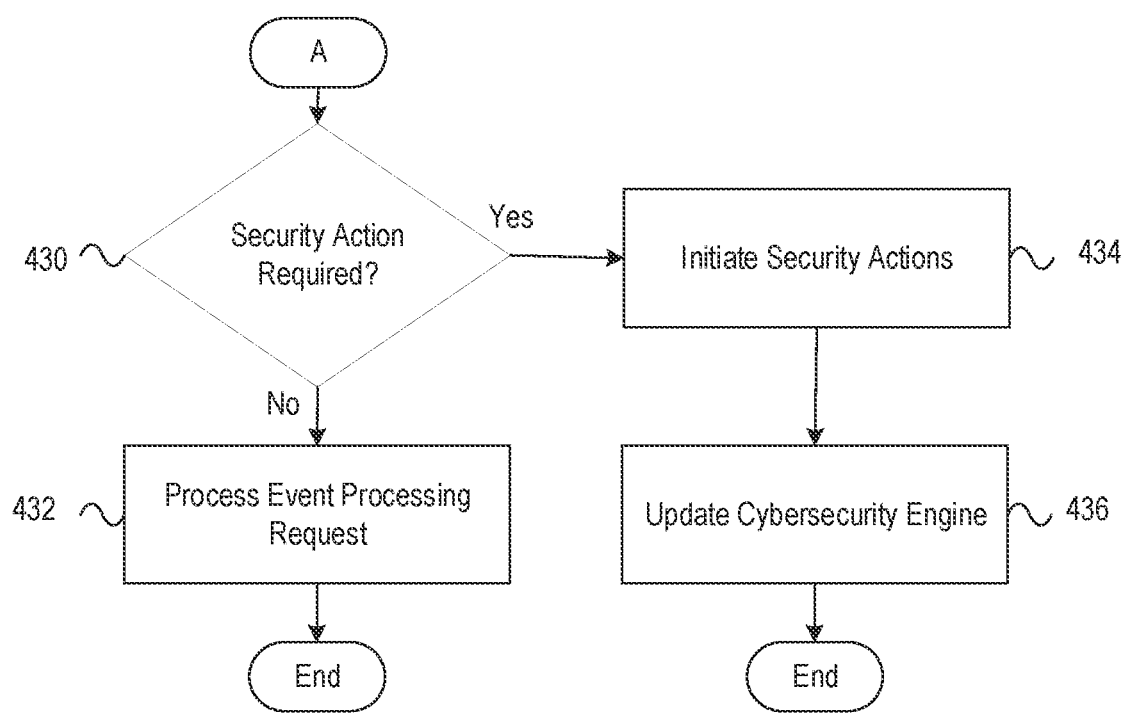

FIGS. 4A-4B depict an illustrative method for implementing an intelligent monitoring platform using graph neural networks with a cybersecurity mesh and associated cybersecurity applications in accordance with one or more example arrangements. Referring to FIG. 4A, at step 402, a computing platform having at least one processor, a communication interface, and memory may train a machine learning model. For example, the computing platform may train a graph neural network (GNN) model. At step 404, the computing platform may train an additional machine learning model. For example, the computing platform may train a cybersecurity engine. At step 406, the computing platform may train an additional machine learning model. For example, the computing platform may train a monitoring model. At step 408, the computing platform may receive an event processing request. At step 410, the computing platform may generate a suspicion score for the event processing request. For example, the computing platform may generate a suspicion score using the GNN model. At step 412, the computing platform may determine whether the suspicion score satisfies a threshold score. Based on determining that the suspicion score does satisfy the threshold, the computing platform may proceed to step 416. Based on determining that the suspicion score does not satisfy the threshold, the computing platform may proceed to step 414

At step 414, based on determining that the suspicion score does not satisfy the threshold, the computing platform may route the event processing request to a default node of a cybersecurity mesh. Based on routing the event processing request to the default node, the computing platform may proceed to step 430, as illustrated at FIG. 4B. At step 416, based on determining that the suspicion score does satisfy the threshold, the computing platform may route the event processing request to a free node of the cybersecurity mesh. Based on routing the event processing request to a free node of the cybersecurity mesh and while the event processing request is at a free node of the cybersecurity mesh, the computing platform may generate a threat score at step 418. For example, the computing platform may generate a threat score for the event processing request using the cybersecurity engine. At step 420, the computing platform may generate an anomaly record for the event processing request. For example, the computing platform may generate the anomaly record based on the threat score and using the monitoring model. At step 422, the computing platform may update the GNN model based on the anomaly record. At step 424, the computing platform may route the event processing request to a trained node of the cybersecurity mesh. For example, the computing platform may route the event processing request to a preferred trained node based on the anomaly record. At step 426, the computing platform may determine a threat prevention response for the event processing request. At step 428, the computing platform may update the monitoring model based on the threat prevention response.

Referring to FIG. 4B, at step 430, the computing platform may determine whether a security action is required. In some examples, based on routing the event processing request to a default node of the cybersecurity mesh, the computing platform may determine that a security action is not required. In some instances, based on the threat prevention response, the computing platform may determine that a security action is required. Based on determining that a security action is not required, the computing platform may proceed to step 432. Based on determining that a security action is required, the computing platform may proceed to step 434. At step 432, based on determining that a security action is not required, the computing platform may process the event processing request. At step 434, based on determining that a security action is required, the computing platform may initiate one or more security actions. At step 436, based on initiating one or more security actions, the computing platform may update the cybersecurity engine.

One or more aspects of the disclosure may be embodied in computer-usable information or computer-executable instructions, such as in one or more program modules, executed by one or more computers or other devices to perform the operations described herein. Generally, program modules include routines, programs, objects, components, information structures, and the like that perform particular tasks or implement particular abstract information types when executed by one or more processors in a computer or other information processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular information structures may be used to more effectively implement one or more aspects of the disclosure, and such information structures are contemplated to be within the scope of computer executable instructions and computer-usable information described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing information or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to information being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to information being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      train a plurality of machine learning models, wherein the plurality of machine learning models comprises, at least:
         a graph neural network (GNN) model configured to output suspicion scores based on input of event processing information,
         a cybersecurity engine configured to output threat scores based on input of event processing information, and
         a monitoring model configured to output anomaly records based on input of threat scores and based on input of event processing information;
      receive an event processing request comprising first event processing information;
      generate, based on inputting the first event processing information into the GNN model, a suspicion score for the event processing request;
      determine, based on comparing the suspicion score to a threshold score, whether the suspicion score satisfies the threshold score;
      based on a determination that the suspicion score satisfies the threshold score, generate, based on inputting the first event processing information into the cybersecurity engine, a threat score for the event processing request;
      input the first event processing information and the threat score for the event processing request into the monitoring model;
      generate, based on inputting the first event processing information and the threat score for the event processing request into the monitoring model, an anomaly record for the event processing request;

determine, based on the anomaly record, a preferred node of a cybersecurity mesh for routing the event processing request;
route the event processing request to the preferred node;
determine, based on routing the event processing request to the preferred node, a threat prevention response; and
initiate, based on the threat prevention response, one or more security actions.

2. The computing platform of claim 1, wherein the threat prevention response is determined based on comparing one or more rules associated with the preferred node to one or more parameters included in the first event processing information.

3. The computing platform of claim 1, wherein the threat prevention response identifies the one or more security actions based on a type of threat corresponding to the event processing request and indicated by the anomaly record.

4. The computing platform of claim 1, wherein generating the suspicion score for the event processing request comprises:
determining, based on comparing the first event processing information to one or more historical event processing patterns generated by the GNN model, a likelihood the event processing request is suspicious,
wherein a given historical event processing pattern of the one or more historical event processing patterns comprises:
a plurality of nodes representing a user associated with a historical event processing request; and
a plurality of edges, wherein each edge of the plurality of edges corresponds to a subset of historical event processing information associated with the historical event processing request.

5. The computing platform of claim 1, wherein training the GNN model comprises training the GNN model based on one or more historical event processing requests, and wherein the memory stores additional computer-readable instructions that, when executed by the at least one processor, cause the computing platform to:
update the GNN model based on the anomaly record; and
generate, using the updated GNN model, one or more event processing patterns corresponding to the event processing request, wherein a given pattern of the one or more event processing patterns comprises:
a plurality of nodes representing a user associated with the event processing request; and
a plurality of edges, wherein each edge of the plurality of edges corresponds to a subset of the first event processing information.

6. The computing platform of claim 1, wherein training the cybersecurity engine comprises training the cybersecurity engine based on one or more historical event processing patterns and based on one or more historical event processing requests, and wherein the memory stores additional computer-readable instructions that, when executed by the at least one processor, cause the computing platform to update the cybersecurity engine based on user input responsive to the one or more security actions.

7. The computing platform of claim 1, wherein training the monitoring model comprises training the monitoring model based on one or more threat prevention rules and based on historical event processing information corresponding to one or more historical threat scores, and wherein the memory stores additional computer-readable instructions that, when executed by the at least one processor, cause the computing platform to update the monitoring model based on the threat prevention response.

8. The computing platform of claim 1, wherein the anomaly record comprises:
the first event processing information;
the threat score for the event processing request;
an indication of a type of threat corresponding to the event processing request; and
a record of one or more historical threat prevention responses corresponding to the type of threat.

9. The computing platform of claim 1, wherein the one or more security actions comprise one or more of:
denying the event processing request,
sending an alert to an event processing system,
sending an alert to a remote cybersecurity platform,
routing the event processing request to one or more free nodes of the cybersecurity mesh,
adding, based on a first subset of the first event processing information, a device corresponding to the event processing request to a device watchlist, or
adding, based on a second subset of the first event processing information, an account corresponding to the event processing request to an account watchlist.

10. The computing platform of claim 1, wherein the memory stores additional computer-readable instructions that, when executed by the at least one processor, cause the computing platform to:
receive a second event processing requesting comprising second event processing information;
generate, based on inputting the second event processing information into the GNN model, a second suspicion score for the second event processing request;
determine, based on comparing the second suspicion score to the threshold score, whether the second suspicion score satisfies the threshold; and
based on a determination that the threshold score exceeds the second suspicion score, cause processing of the second event processing request, wherein causing processing of the second event processing request comprises:
updating an entry at a stored distributed ledger, or
adding an entry to the stored distributed ledger.

11. A method comprising:
at a computing device comprising at least one processor, a communication interface, and memory:
training a plurality of machine learning models, wherein the plurality of machine learning models comprises, at least:
a graph neural network (GNN) model configured to output suspicion scores based on input of event processing information,
a cybersecurity engine configured to output threat scores based on input of event processing information, and
a monitoring model configured to output anomaly records based on input of threat scores and based on input of event processing information;
receiving an event processing requesting comprising first event processing information;
generating, based on inputting the first event processing information into the GNN model, a suspicion score for the event processing request;
determining, based on comparing the suspicion score to a threshold score, whether the suspicion score satisfies the threshold score;
based on a determination that the suspicion score satisfies the threshold score, generating, based on inputting the first event processing information into the cybersecurity engine, a threat score for the event processing request;

inputting the first event processing information and the threat score for the event processing request into the monitoring model;

generating, based on inputting the first event processing information and the threat score for the event processing request into the monitoring model, an anomaly record for the event processing request;

determining, based on the anomaly record, a preferred node of a cybersecurity mesh for routing the event processing request;

routing the event processing request to the preferred node;

determining, based on routing the event processing request to the preferred node, a threat prevention response; and initiating, based on the threat prevention response, one or more security actions.

12. The method of claim 11, wherein the threat prevention response is determined based on comparing one or more rules associated with the preferred node to one or more parameters included in the first event processing information.

13. The method of claim 11, wherein the threat prevention response identifies the one or more security actions based on a type of threat corresponding to the event processing request and indicated by the anomaly record.

14. The method of claim 11, wherein generating the suspicion score for the event processing request comprises:

determining, based on comparing the first event processing information to one or more historical event processing patterns generated by the GNN model, a likelihood the event processing request is suspicious, wherein a given historical event processing pattern of the one or more historical event processing patterns comprises:

a plurality of nodes representing a user associated with a historical event processing request; and a plurality of edges, wherein each edge of the plurality of edges corresponds to a subset of historical event processing information associated with the historical event processing request.

15. The method of claim 11, wherein training the GNN model comprises training the GNN model based on one or more historical event processing requests, and further comprising:

updating the GNN model based on the anomaly record; and generating, using the updated GNN model, one or more event processing patterns corresponding to the event processing request, wherein a given pattern of the one or more event processing patterns comprises:

a plurality of nodes representing a user associated with the event processing request; and a plurality of edges, wherein each edge of the plurality of edges corresponds to a subset of the first event processing information.

16. One or more non-transitory computer-readable media storing instructions that, when executed by a computing platform comprising at least one processor, a communication interface, and memory, cause the computing platform to:

train a plurality of machine learning models, wherein the plurality of machine learning models comprises, at least:

a graph neural network (GNN) model configured to output suspicion scores based on input of event processing information, a cybersecurity engine configured to output threat scores based on input of event processing information, and a monitoring model configured to output anomaly records based on input of threat scores and based on input of event processing information;

receive an event processing requesting comprising first event processing information;

generate, based on inputting the first event processing information into the GNN model, a suspicion score for the event processing request;

determine, based on comparing the suspicion score to a threshold score, whether the suspicion score satisfies the threshold score;

based on a determination that the suspicion score satisfies the threshold score, generate, based on inputting the first event processing information into the cybersecurity engine, a threat score for the event processing request;

input the first event processing information and the threat score for the event processing request into the monitoring model;

generate, based on inputting the first event processing information and the threat score for the event processing request into the monitoring model, an anomaly record for the event processing request;

determine, based on the anomaly record, a preferred node of a cybersecurity mesh for routing the event processing request;

route the event processing request to the preferred node;

determine, based on routing the event processing request to the preferred node, a threat prevention response; and initiate, based on the threat prevention response, one or more security actions.

17. The one or more non-transitory computer-readable media of claim 16, wherein the threat prevention response is determined based on comparing one or more rules associated with the preferred node to one or more parameters included in the first event processing information.

18. The one or more non-transitory computer-readable media of claim 16, wherein the threat prevention response identifies the one or more security actions based on a type of threat corresponding to the event processing request and indicated by the anomaly record.

19. The one or more non-transitory computer-readable media of claim 16, wherein generating the suspicion score for the event processing request comprises:

determining, based on comparing the first event processing information to one or more historical event processing patterns generated by the GNN model, a likelihood the event processing request is suspicious, wherein a given historical event processing pattern of the one or more historical event processing patterns comprises:

a plurality of nodes representing a user associated with a historical event processing request; and a plurality of edges, wherein each edge of the plurality of edges corresponds to a subset of historical event processing information associated with the historical event processing request.

20. The one or more non-transitory computer-readable media of claim 16, wherein training the GNN model comprises training the GNN model based on one or more historical event processing requests, and storing instructions that, when executed by the at least one processor, cause the computing platform to:
   update the GNN model based on the anomaly record; and
   generate, using the updated GNN model, one or more event processing patterns corresponding to the event processing request, wherein a given pattern of the one or more event processing patterns comprises:
      a plurality of nodes representing a user associated with the event processing request; and
      a plurality of edges, wherein each edge of the plurality of edges corresponds to a subset of the first event processing information.

\* \* \* \* \*